US012546245B2

(12) United States Patent
Thobe

(10) Patent No.: US 12,546,245 B2
(45) Date of Patent: *Feb. 10, 2026

(54) SYSTEMS AND METHODS FOR BACKHAUL TRANSPORTATION OF LIQUEFIED GAS AND CO2 USING LIQUEFIED GAS CARRIERS

(71) Applicant: MARATHON PETROLEUM COMPANY LP, Findlay, OH (US)

(72) Inventor: Zachary D. Thobe, Findlay, OH (US)

(73) Assignee: Marthon Petroleum Company LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,656

(22) Filed: Apr. 29, 2024

(65) Prior Publication Data

US 2024/0271556 A1 Aug. 15, 2024

Related U.S. Application Data

(60) Continuation of application No. 18/234,800, filed on Aug. 16, 2023, now Pat. No. 12,012,883, which is a (Continued)

(51) Int. Cl.
*F17C 7/00* (2006.01)
*F01N 13/08* (2010.01)
*G06Q 20/10* (2012.01)

(52) U.S. Cl.
CPC ............... *F01N 13/08* (2013.01); *F17C 7/00* (2013.01); *G06Q 20/10* (2013.01);
(Continued)

(58) Field of Classification Search
CPC ...... F01N 13/08; F17C 7/00; F17C 2221/013; F17C 2270/0168; B67D 7/0492
See application file for complete search history.

(56) References Cited

U.S. PATENT DOCUMENTS 2,626,627 A 1/1953 Jung et al.
2,864,252 A 12/1958 Schaschl
(Continued)

FOREIGN PATENT DOCUMENTS

AU 2010241217 11/2010
AU 2013202839 5/2014
(Continued)

OTHER PUBLICATIONS

Annex to Form PCT/ISA/206, Communication Relating to the Results of the Partial International Search for international application No. PCT/US2024/021101 mailed Aug. 13, 2024.
(Continued)

*Primary Examiner* — Jason K Niesz
(74) *Attorney, Agent, or Firm* — Ray Quinney & Nebeker P.C.; Paul N. Taylor

(57) ABSTRACT

Embodiments of systems and methods for transporting liquefied gas and carbon dioxide (CO2) in a dual-fluid vessel thereby minimizing transportation between locations are disclosed. In an embodiment, the dual-fluid vessel has an outer shell with an outer surface, an outer compartment within the outer shell configured to store liquefied gas, a bladder positioned within the outer compartment configured to store CO2, and insulation positioned between the outer shell and the outer compartment to provide temperature regulation for the liquefied gas when positioned in the outer compartment and CO2 in the bladder.

23 Claims, 11 Drawing Sheets

Related U.S. Application Data continuation-in-part of application No. 18/227,472, filed on Jul. 28, 2023, now Pat. No. 12,000,538, and a continuation-in-part of application No. 18/217,270, filed on Jun. 30, 2023, now Pat. No. 11,988,336, and a continuation-in-part of application No. 18/207,722, filed on Jun. 9, 2023, now Pat. No. 11,920,504, said application No. 18/227,472 is a continuation of application No. 18/129,926, filed on Apr. 3, 2023, now Pat. No. 11,774,042, said application No. 18/207,722 is a continuation of application No. 18/093,747, filed on Jan. 5, 2023, now Pat. No. 11,739,679, and a continuation of application No. 18/093,756, filed on Jan. 5, 2023, now Pat. No. 11,761,366, said application No. 18/217,270 is a continuation of application No. 18/093,741, filed on Jan. 5, 2023, now Pat. No. 11,815,227, said application No. 18/129,926 is a division of application No. 18/082,656, filed on Dec. 16, 2022, now Pat. No. 11,655,940, said application No. 18/093,741 is a division of application No. 17/739,488, filed on May 9, 2022, now Pat. No. 11,578,836, said application No. 18/082,656 is a continuation-in-part of application No. 17/739,488, filed on May 9, 2022, now Pat. No. 11,578,836, and a continuation-in-part of application No. 17/652,530, filed on Feb. 25, 2022, now Pat. No. 11,578,638, said application No. 18/093,747 is a division of application No. 17/652,530, filed on Feb. 25, 2022, now Pat. No. 11,578,638, said application No. 18/093,756 is a division of application No. 17/652,530, filed on Feb. 25, 2022, now Pat. No. 11,578,638, said application No. 17/739,488 is a continuation-in-part of application No. 17/652,530, filed on Feb. 25, 2022, now Pat. No. 11,578,638.

(60) Provisional application No. 63/377,822, filed on Sep. 30, 2022, provisional application No. 63/267,567, filed on Feb. 4, 2022, provisional application No. 63/265,554, filed on Dec. 16, 2021, provisional application No. 63/200,581, filed on Mar. 16, 2021.

(52) U.S. Cl.
CPC .............. *F17C 2205/0352* (2013.01); *F17C 2221/013* (2013.01); *F17C 2227/0135* (2013.01); *F17C 2227/0157* (2013.01); *F17C 2250/032* (2013.01); *F17C 2250/0443* (2013.01); *F17C 2250/0447* (2013.01); *F17C 2270/0168* (2013.01)

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,814,148 A | 6/1974 | Wostl |
| 3,925,592 A | 12/1975 | Webb |
| 3,961,493 A | 6/1976 | Nolan, Jr |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,315,602 A | 2/1982 | Kubacak |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,784,324 A | 11/1988 | DeWitt |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,072,380 A | 12/1991 | Randelman et al. |
| 5,095,977 A | 3/1992 | Ford |
| 5,129,432 A | 7/1992 | Dugger |
| 5,191,537 A | 3/1993 | Edge |
| 5,305,631 A | 4/1994 | Whited |
| 5,367,882 A | 11/1994 | Lievens et al. |
| 5,383,243 A | 1/1995 | Thacker |
| 5,423,607 A | 6/1995 | Jones |
| 5,469,830 A | 11/1995 | Gonzalez |
| 5,516,967 A | 5/1996 | Pandey |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,628,351 A | 5/1997 | Ramsey, Jr. et al. |
| 5,660,602 A | 8/1997 | Collier, Jr. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,887,974 A | 3/1999 | Pozniak |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,220,747 B1 | 4/2001 | Gosselin |
| 6,243,483 B1 | 6/2001 | Petrou et al. |
| 6,328,877 B1 | 12/2001 | Bushman |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |

(56) References Cited

U.S. PATENT DOCUMENTS

| | | |
|---|---|---|
| 7,032,629 B1 | 4/2006 | Mattingly et al. |
| 7,091,421 B2 | 8/2006 | Kukita et al. |
| 7,121,040 B2 | 10/2006 | Wiese |
| 7,168,464 B2 | 1/2007 | Diggins |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,616,760 B2 | 12/2013 | Williams et al. |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,912,924 B2 | 12/2014 | Scofield et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |
| 9,310,016 B2 | 4/2016 | Hodde |
| 9,329,066 B2 | 5/2016 | Skarping |
| 9,363,462 B2 | 6/2016 | Yoel |
| 9,388,350 B2 | 7/2016 | Buchanan |
| 9,497,956 B2 | 11/2016 | Dubose |
| 9,518,693 B2 | 12/2016 | Hodde |
| 9,530,121 B2 | 12/2016 | Brauer et al. |
| 9,550,247 B2 | 1/2017 | Smith |
| 9,643,135 B1 | 5/2017 | Mazzei et al. |
| 9,945,333 B2 | 4/2018 | Kopinsky |
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |
| 10,134,042 B1 | 11/2018 | Prasad et al. |
| 10,168,255 B1 | 1/2019 | Johnsen |
| 10,196,243 B1 | 2/2019 | Wells |
| 10,197,206 B1 | 2/2019 | Dray et al. |
| 10,223,596 B1 | 3/2019 | Edwards et al. |
| 10,247,643 B1 | 4/2019 | Johnsen |
| 10,261,279 B1 | 4/2019 | Potter |
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |
| 10,405,475 B2 | 9/2019 | Goda |
| 10,408,377 B1 | 9/2019 | Dray et al. |
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 | 11/2020 | Tassell, Jr. |
| 10,943,357 B2 | 3/2021 | Badawy et al. |
| 10,948,471 B2 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B1 | 4/2021 | Miller |
| 10,997,707 B1 | 5/2021 | Katz et al. |
| 11,010,608 B2 | 5/2021 | Adam et al. |
| 11,027,304 B2 | 6/2021 | Donaldson |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,320,519 B2 | 5/2022 | Koivuranta |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,428,622 B2 | 8/2022 | Borin et al. |
| 11,441,088 B2 | 9/2022 | Robbins |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,687,858 B2 | 6/2023 | Rentz |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,761,366 B2 | 9/2023 | Thobe |
| 11,774,042 B2 | 10/2023 | Thobe |
| 11,789,453 B2 | 10/2023 | Chowdhary |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,842,538 B2 | 12/2023 | Saxena |
| 11,920,504 B2 | 3/2024 | Thobe |
| 11,965,317 B2 | 4/2024 | Jordan |
| 11,988,336 B2 | 5/2024 | Thobe |
| 12,000,538 B2 | 6/2024 | Thobe |
| 12,006,014 B1 | 6/2024 | Ernst |
| 12,011,697 B2 | 6/2024 | Miller |
| 12,012,082 B1 | 6/2024 | Pittman, Jr. |
| 12,012,883 B2 * | 6/2024 | Thobe .................. F01N 13/08 |
| 12,043,361 B1 | 7/2024 | Ernst |
| 12,043,905 B2 | 7/2024 | Ell |
| 12,043,906 B2 | 7/2024 | Ell |
| 12,066,843 B2 | 8/2024 | Miller |
| 12,087,002 B1 | 9/2024 | Miller et al. |
| 12,109,543 B2 | 10/2024 | Miller |
| 12,128,369 B2 | 10/2024 | Miller |
| 12,129,559 B2 | 10/2024 | Ell |
| 12,163,625 B2 | 12/2024 | Thobe |
| 12,180,597 B2 | 12/2024 | Ell |
| 2001/0013517 A1 | 8/2001 | Hart |
| 2002/0014068 A1 | 2/2002 | Mittricker et al. |
| 2002/0178806 A1 | 12/2002 | Valentine |
| 2002/0185180 A1 | 12/2002 | Smith |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |

(56) References Cited

U.S. PATENT DOCUMENTS

| | | |
|---|---|---|
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0251313 A1 | 12/2004 | Burgess |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0176482 A1 | 8/2005 | Raisinghani et al. |
| 2005/0284333 A1 | 12/2005 | Falkiewicz |
| 2006/0125826 A1 | 6/2006 | Lubkowitz |
| 2006/0263283 A1 | 11/2006 | Egan |
| 2006/0278304 A1 | 12/2006 | Mattingly et al. |
| 2007/0175511 A1 | 8/2007 | Doerr |
| 2007/0181083 A1 | 8/2007 | Fulton |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2009/0009308 A1 | 1/2009 | Date et al. |
| 2009/0107111 A1 | 4/2009 | Oliver |
| 2009/0154288 A1 | 6/2009 | Heathman |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2009/0278839 A1 | 11/2009 | Geis |
| 2010/0031825 A1 | 2/2010 | Kemp |
| 2010/0049410 A1 | 2/2010 | McKee |
| 2010/0058666 A1 | 3/2010 | Kim |
| 2010/0175316 A1 | 7/2010 | Kubacak |
| 2010/0198775 A1 | 8/2010 | Rousselle |
| 2011/0265449 A1 | 11/2011 | Powell |
| 2012/0027298 A1 | 2/2012 | Dow |
| 2012/0092835 A1 | 4/2012 | Miller |
| 2012/0143560 A1 | 6/2012 | Tabet et al. |
| 2012/0153042 A1 | 6/2012 | Oedekoven |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2013/0317959 A1 | 11/2013 | Joos |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0133824 A1 | 5/2014 | Yoel |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0172513 A1 | 6/2014 | MacLean |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0269288 A1 | 9/2015 | Moore |
| 2015/0323119 A1 | 11/2015 | Giunta |
| 2016/0071059 A1 | 3/2016 | Petering |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0140237 A1 | 5/2017 | Voeller et al. |
| 2017/0158303 A1 | 6/2017 | Michaelis et al. |
| 2017/0180012 A1 | 6/2017 | Tingler et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1* | 5/2018 | Allidieres ............ F17C 13/025 |
| 2018/0143734 A1 | 5/2018 | Ochenas et al. |
| 2018/0186528 A1 | 7/2018 | Tonn |
| 2018/0218214 A1 | 8/2018 | Pestun |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0136060 A1 | 5/2019 | Helgason et al. |
| 2019/0270500 A1 | 9/2019 | Hamaoka |
| 2019/0295189 A1 | 9/2019 | Strasser |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0367732 A1 | 12/2019 | Helgason et al. |
| 2019/0368054 A1 | 12/2019 | Gummow et al. |
| 2019/0368156 A1 | 12/2019 | Faivre |
| 2020/0033252 A1 | 1/2020 | Borin et al. |
| 2020/0118413 A1 | 4/2020 | Kanukurthy et al. |
| 2020/0232191 A1 | 7/2020 | Prior |
| 2020/0235559 A1 | 7/2020 | Neuenschwander |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1* | 3/2021 | Yokoyama ............ F01N 3/0857 |
| 2021/0073692 A1 | 3/2021 | Saha et al. |
| 2021/0076006 A1 | 3/2021 | O'Neill et al. |
| 2021/0095380 A1 | 4/2021 | Borin et al. |
| 2021/0123211 A1 | 4/2021 | Miller et al. |
| 2021/0138399 A1* | 5/2021 | Yokoyama ............ F01N 3/0857 |
| 2021/0192938 A1 | 6/2021 | Doerr et al. |
| 2021/0197151 A1 | 7/2021 | Miller |
| 2021/0207772 A1 | 7/2021 | Norton et al. |
| 2021/0215925 A1 | 7/2021 | Kim et al. |

(56) References Cited

U.S. PATENT DOCUMENTS

| | | | |
|---|---|---|---|
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0348281 A1 | 11/2021 | da Costa |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0183208 A1 | 6/2022 | Sibley |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2022/0405870 A1 | 12/2022 | Conway |
| 2023/0012038 A1 | 1/2023 | Iyer |
| 2023/0012673 A1 | 1/2023 | Fukuyama et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0338897 A1 | 10/2023 | Bednar |
| 2023/0341092 A1 | 10/2023 | Thobe |
| 2023/0347303 A1 | 11/2023 | Miller |
| 2023/0358023 A1 | 11/2023 | Jordan et al. |
| 2023/0360151 A1 | 11/2023 | Swamy |
| 2023/0366510 A1 | 11/2023 | Thobe |
| 2023/0383416 A1 | 11/2023 | Ell |
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Ell |
| 2024/0060189 A1 | 2/2024 | Ell |
| 2024/0071073 A1 | 2/2024 | Rajora |
| 2024/0141506 A1 | 5/2024 | Ell |
| 2024/0166492 A1 | 5/2024 | Thobe |
| 2024/0209988 A1 | 6/2024 | Thobe |
| 2024/0217498 A1 | 7/2024 | Pittman, Jr. |
| 2024/0255102 A1 | 8/2024 | Thobe |
| 2024/0269626 A1 | 8/2024 | Miller |
| 2024/0278762 A1 | 8/2024 | Pittman, Jr. |
| 2024/0278894 A1 | 8/2024 | Ernst |
| 2024/0286726 A1 | 8/2024 | Ernst |
| 2024/0301811 A1 | 9/2024 | Thobe |
| 2024/0327992 A1 | 10/2024 | Ell |
| 2024/0327993 A1 | 10/2024 | Ell |

FOREIGN PATENT DOCUMENTS

| | | |
|---|---|---|
| AU | 2009202785 B | 11/2014 |
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 202898548 U | 4/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 104372350 B | 2/2017 |
| CN | 106764463 | 1/2019 |
| CN | 208306600 | 1/2019 |
| CN | 110513604 | 11/2019 |
| CN | 210176958 | 3/2020 |
| CN | 111537157 | 8/2020 |
| CN | 114001278 | 2/2022 |
| CN | 113719746 | 11/2022 |
| CN | 115325460 A | 11/2022 |
| CN | 114877263 | 4/2023 |
| CN | 220458389 U | 2/2024 |
| EP | 2458573 | 5/2012 |
| EP | 2586304 A1 | 5/2013 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| JP | 2021030945 A | 3/2021 |
| KR | 20110010316 | 2/2011 |
| KR | 20130038986 | 4/2013 |
| KR | 20200007444 A | 1/2020 |
| KR | 102129951 | 7/2020 |
| KR | 102169280 | 10/2020 |
| KR | 102281640 | 7/2021 |
| RU | 2760879 | 12/2021 |
| RU | 217534 U1 | 4/2023 |
| WO | 1996006685 | 5/1996 |
| WO | 1997006004 | 2/1997 |
| WO | 1997006298 | 2/1997 |
| WO | 1998003711 | 1/1998 |
| WO | 199917606 | 4/1999 |
| WO | 2000063108 | 10/2000 |
| WO | 2002030551 | 4/2002 |
| WO | 2002082181 | 10/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |
| WO | 2010002274 | 1/2010 |
| WO | 2010042704 | 4/2010 |
| WO | 2010103260 | 9/2010 |
| WO | 2011127535 | 10/2011 |
| WO | 2013112274 | 8/2013 |
| WO | 2014089443 | 6/2014 |
| WO | 2014173672 | 10/2014 |
| WO | 2015061868 | 5/2015 |

(56) References Cited

FOREIGN PATENT DOCUMENTS

| | | |
|---|---|---|
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2022269052 | 12/2022 |
| WO | 2023287276 | 1/2023 |
| WO | 2023021769 | 2/2023 |
| WO | 2023038579 | 3/2023 |
| WO | 2023060350 | 4/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Sadovnychiy, Sergiy et al. "Geographical information system applications for pipeline right of way aerial surveillance", International Conference on Geographical Information Systems Theory, Applications and Management, vol. 2, SCITEPRESS, 2017.

Paschal, Kayla, "Utility Right of Way Management: Potential for Expanded Integrated Vegetation Management in California", 2014.

Skelton et al., Onboard Refueling Vapor Recovery Systems Analysis of Widespread Use,Nescaum, Boston MA, Aug. 20, 2007.

Membrane Technology and Research, Inc., Gasoline Vapor Recovery, 2018.

Jordan Technologies, Aereon, Recovering More Vapor = Increased Profits, 2015.

EPFL, Capturing CO2 from trucks and reducing their emissions by 90%, Dec. 23, 2019.

Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.

Information Disclosure Declaration by Kyle E. Miller, Dec. 18, 2020.

Cott Manufacturing Company, FinkLet®/FinkPlate® Cathodic Proection Test Stations, Wayback Machine, May 22, 2000.

International Search Report and Written Opinion for international application No. PCT/US2024/021101 mailed on Oct. 9, 2024.

International Search Report and Written Opinion for international application No. PCT/US2024/021099 mailed on Aug. 2, 2024.

Alexandrakis et al.,"Marine Transportation for Carbon Capture and Sequestration (CCS)", Department of Civil and Environmental Engineering, Thesis, Massachusetts Institute of Technology, Jun. 2010.

Datta et al., "Advancing carbon management through the global commoditization of CO2: the case for dual-use LNG-CO2 shipping", Carbon Management, 2020, vol. 11, No. 6, 611-630.

Ibitoye et al., "Poster Abstract: A Convolutional Neural Network Based Solution for Pipeline Leak Detection", School of Information Technology, Carleton University, Ottawa, Canada, Nov. 2019.

IntelliView, "Thermal Imaging Provides Early Leak Detection in Oil and Gas Pipelines", Petro Industry News, www.Petro-Online.com, Aug./Sep. 2018.

Southwest Research Institute, "Methane Leak Detection", 2021.

Masterduct, "Case Studies: High temp marine grade ship engine exhaust fume hose", retrieved at https://www.masterduct.com/CaseStudies/Hightempshipengineexhaustfumehose.aspx.

ACTI, "Advanced Maritime Emissions Control System (AMECS)", retrieved at https://sustainableworldports.org/wp-content/uploads/presentation-on-AMECS.pdf.

Lloyd's Register, Using technology to trace the carbon intensity of sustainable marine fuels, Feb. 15, 2023.

BORIN Manufacturing, Inc., DART for Test Station, Above Ground Remote Monitoring, Feb. 11, 2021.

BORIN Manufacturing, Inc., COMMANCHE Remote Monitoring and Control System, Mar. 24, 2017.

BORIN Manufacturing, Inc., DART for Rectifiers, Remote Monitoring and Control System. Nov. 1, 2017.

BORIN Manufacturing, Inc., STELTH 2 Solid-State Reference Electrode for Buried and Concrete Service, Aug. 7, 2015.

BORIN Manufacturing, Inc., STELTH 3, Nov. 10, 2016.

BORIN Manufacturing, Inc., STELTH Reference Electrodes, Feb. 4, 2016.

BORIN Manufacturing, Inc., STELTH Solid-State Reference Electrodes, Nov. 8, 2016.

BORIN Manufacturing, Inc., STELTH Reference Electrodes, Oct. 10, 2017.

BORIN Manufacturing, Inc., 'Miracle half-cell', Palladium: BORIN's new reference electrode chemistry, Aug. 13, 2014.

BORIN Manufacturing, Inc., STREET DART, For Test Station, Ground Level Remote Monitoring, Mar. 2017.

Neutrik XXR-2 XX Series, https://www.parts-express.com/Neutrik-XXR-2-XX-Series-Color-Coding_Ring-Red, 2022.

Hou, Qingmin, An FBG Strain Sensor-Based NPW Method for Natural Gas Pipeline Leakage Detection, Hindawi, Mathematical Problems in Engineering,vol. 2021, Article ID 5548503, pp. 1-8.

\* cited by examiner

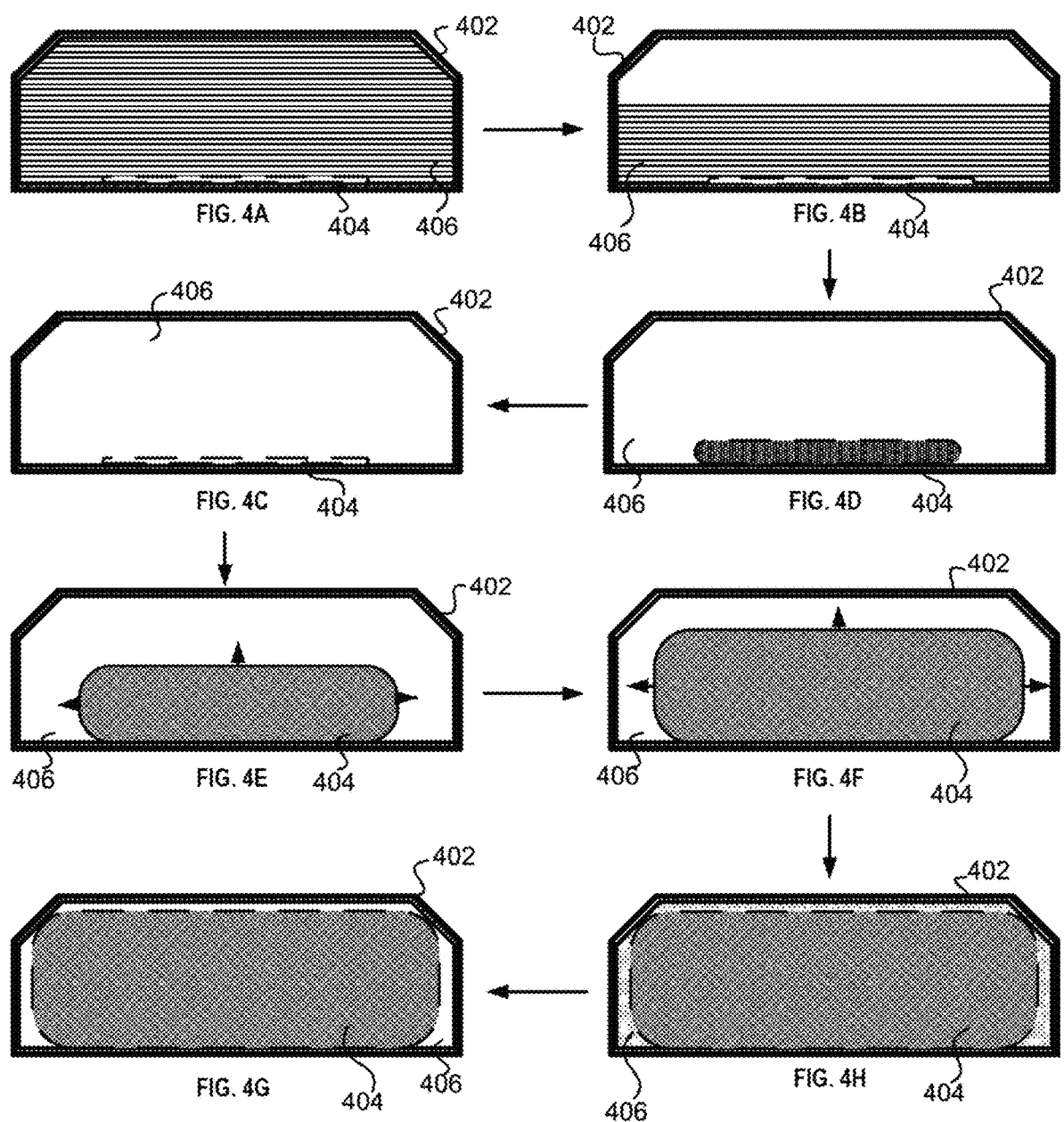

600

```
┌─────────────────────────────────────────────────────────────────┐
│          Station a liquefied gas carrier at the location         │
│                              602                                 │
└─────────────────────────────────────────────────────────────────┘
                                │
                                ▼
┌─────────────────────────────────────────────────────────────────┐
│  Align one or more articulated rigid loading arms with the outer │
│  compartment or the bladder of each of the one or more           │
│  dual-fluid storage tanks                                        │
│                              604                                 │
└─────────────────────────────────────────────────────────────────┘
                                │
                                ▼
┌─────────────────────────────────────────────────────────────────┐
│ Connect each of the one or more articulated rigid loading arms   │
│ to each of the bladder or outer compartment of the one or more   │
│ dual-fluid storage tanks                                         │
│                              606                                 │
└─────────────────────────────────────────────────────────────────┘
                                │
                                ▼
┌─────────────────────────────────────────────────────────────────┐
│ Pump liquefied gas from the outer compartment to one or more     │
│ liquefied gas storage tanks or $CO_2$ from the bladder to one or │
│ more $CO_2$ storage tanks at the designated location             │
│                              608                                 │
└─────────────────────────────────────────────────────────────────┘
                                │
                                ▼
┌─────────────────────────────────────────────────────────────────┐
│ Pump the liquefied gas from one or more liquefied gas storage    │
│ tanks to the outer compartment or the $CO_2$ from the one or more│
│ $CO_2$ storage tanks to the bladder                              │
│                              610                                 │
└─────────────────────────────────────────────────────────────────┘
                                │
                                ▼
┌─────────────────────────────────────────────────────────────────┐
│ Disconnect each of the one or more articulated rigid loading     │
│ arms from the outer compartment or the bladder of each of the    │
│ one or more dual-fluid storage tanks                             │
│                              612                                 │
└─────────────────────────────────────────────────────────────────┘
```

FIG. 6

SYSTEMS AND METHODS FOR BACKHAUL TRANSPORTATION OF LIQUEFIED GAS AND CO2 USING LIQUEFIED GAS CARRIERS

CROSS-REFERENCE TO RELATED APPLICATION

This application is a continuation of U.S. Non-Provisional application Ser. No. 18/234,800, filed Aug. 16, 2023, titled "SYSTEMS AND METHODS FOR BACKHAUL TRANSPORTATION OF LIQUEFIED GAS AND CO2 USING LIQUEFIED GAS CARRIERS," which is a continuation-in-part of U.S. Non-Provisional application Ser. No. 18/207,722, filed Jun. 9, 2023, titled "SCALABLE GREENHOUSE GAS CAPTURE SYSTEMS AND METHODS," now U.S. Pat. No. 11,920,504, issued Mar. 5, 2024, which is a continuation of U.S. Non-Provisional application Ser. No. 18/093,756, filed Jan. 5, 2023, titled "SCALABLE GREENHOUSE GAS CAPTURE SYSTEMS AND METHODS," now U.S. Pat. No. 11,761,366, issued Sep. 19, 2023, which is a divisional of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. Non-Provisional application Ser. No. 18/207,722 is also a continuation of U.S. Non-Provisional application Ser. No. 18/093,747, filed Jan. 5, 2023, titled "SCALABLE GREENHOUSE GAS CAPTURE SYSTEMS AND METHODS," now U.S. Pat. No. 11,739,679, issued Aug. 29, 2023, which is a divisional of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. application Ser. No. 18/234,800 is also a continuation-in-part of U.S. Non-Provisional application Ser. No. 18/227,472, filed Jul. 28, 2023, titled "SYSTEMS AND METHODS FOR TRANSPORTING FUEL AND CARBON DIOXIDE IN A DUAL FLUID VESSEL," which is a continuation U.S. Non-Provisional application Ser. No. 18/129,926, filed Apr. 3, 2023, titled "SYSTEMS AND METHODS FOR TRANSPORTING FUEL AND CARBON DIOXIDE IN A DUAL FLUID VESSEL," now U.S. Pat. No. 11,774,042, issued Oct. 3, 2023, which is a divisional of U.S. Non-Provisional application Ser. No. 18/082,656, filed Dec. 16, 2022, titled "SYSTEMS AND METHODS FOR TRANSPORTING FUEL AND CARBON DIOXIDE IN A DUAL FLUID VESSEL," now U.S. Pat. No. 11,655,940, issued May 23, 2023, which claims priority to, and the benefit of, U.S. Provisional Application No. 63/265,554, filed Dec. 16, 2021, titled "SYSTEMS AND METHODS FOR TRANSPORTING FUEL AND CO2 IN A DUAL FLUID VESSEL," and U.S. Provisional Application No. 63/377,822, filed Sep. 30, 2022, titled "SYSTEMS AND METHODS FOR TRANSPORTING FUEL AND CO2 IN A DUAL FLUID VESSEL," the disclosures of which are incorporated herein by reference in their entireties. U.S. Non-Provisional application Ser. No. 18/082,656 is a continuation-in-part of U.S. Non-Provisional application Ser. No. 17/739,488, filed May 9, 2022, titled "SCALABLE GREENHOUSE GAS CAPTURE SYSTEMS AND METHODS," now U.S. Pat. No. 11,578,836, issued Feb. 14, 2023, which is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to related to U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. Non-Provisional application Ser. No. 18/082,656 is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. application Ser. No. 18/234,800 is further a continuation-in-part of U.S. Non-Provisional application Ser. No. 18/217,270, filed Jun. 30, 2023, titled "SCALABLE GREENHOUSE GAS CAPTURE SYSTEMS AND METHODS," which is a continuation of U.S. Non-Provisional application Ser. No. 18/093,741, filed Jan. 5, 2023, titled "SCALABLE GREENHOUSE GAS CAPTURE SYSTEMS AND METHODS," now U.S. Pat. No. 11,815,227, issued Nov. 14, 2023, which is a divisional of U.S. Non-Provisional application Ser. No. 17/739,488, filed May 9, 2022, titled "SCALABLE GREENHOUSE GAS CAPTURE SYSTEMS AND METHODS," now U.S. Pat. No. 11,578,836, issued Feb. 14, 2023, which is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to related to U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties.

FIELD OF DISCLOSURE

The present disclosure relates to systems and methods for dual-fluid storage of a liquid or gaseous commodity and carbon dioxide. More specifically, the present disclosure relates to methods and systems for transporting a liquid or gaseous commodity and carbon dioxide using liquefied gas carriers.

BACKGROUND

Carbon capture and storage or utilization is an important technological approach to reduce carbon from entering the atmosphere and can be applied to many energy industries. Carbon capture and storage typically involves three steps including: (1) capturing the carbon dioxide, (2) transporting the captured carbon dioxide, and (3) storing the carbon dioxide. Countries have differing standards on requirements needed to reduce the amount of greenhouse gases released into the atmosphere. Growing demand for the reduction of greenhouse gases provides market opportunity to transport captured carbon across different continents and to different countries, which have either suitable geological specifications to permanently sequester carbon or developed technology to utilize the carbon to manufacture useful products. Liquefied gas shipping carriers to transport hydrocarbons, such as liquefied natural gas (LNG) and/or liquefied petroleum gas (LPG), are often used to transport those hydrocarbon commodities at scale. The liquefied gas carriers transport the hydrocarbon fluids stored therein to a location with demand; however, the liquefied gas carriers typically returns empty.

SUMMARY OF THE DISCLOSURE

Provided here are systems and methods to address these shortcomings of the art and provide other additional or alternative advantages. The disclosure herein provides several embodiments of a liquefied gas carrier configured to transport liquefied gas and carbon dioxide ($CO_2$). An embodiment of the liquefied gas carrier includes one or more dual-fluid storage tanks positioned on a liquefied gas carrier to transport liquefied gas and/or $CO_2$. The one or more dual-fluid storage tanks have (i) an outer shell, (ii) an outer compartment positioned within the outer shell configured to store the liquefied gas (or, in some embodiments, $CO_2$), and (iii) a bladder positioned within the outer compartment configured to expand when the $CO_2$ (or, in some embodiments, liquefied gas) flows therein, thereby to reduce contamination between the $CO_2$ and the liquefied gas. Insulation is positioned between the outer shell and the outer compartment to provide temperature regulation from external heat sources to reduce boil off of the liquefied gas when positioned in the outer compartment and $CO_2$ in the bladder.

In certain embodiments, a pressure and temperature rating for the one or more dual-fluid storage tanks comprises about 80 pounds per square inch gauge (psig) to about 102 psig maximum pressure and about −260 degrees Fahrenheit minimum temperature. In certain embodiments, the one or more dual-fluid storage tanks comprises one or more of spherical tanks, refrigerated tanks, prismatic tanks, cylindrical tanks, or bilobe tanks. In certain embodiments, the one or more dual-fluid storage tanks include one or more temperature-control apparatuses. In certain embodiments, the one or more dual-fluid storage tanks include one or more pressure-control apparatuses. In certain embodiments, the bladder contracts when fluid flows therefrom. In certain embodiments, if the bladder is partially or substantially empty, the outer compartment fills with nitrogen to stabilize the bladder. In certain embodiments, the one or more dual-fluid storage tanks further include one or more membranes, waffles, or baffles positioned within each of the one or more dual-fluid storage tanks.

In another embodiment, a dual-fluid transport system for transporting liquefied natural gas (LNG) and $CO_2$ includes an LNG carrier configured to transport LNG and $CO_2$. The LNG carrier includes one or more dual-fluid storage tanks positioned on the LNG carrier to transport the LNG and/or the $CO_2$. The one or more dual-fluid storage tanks have (i) an outer shell, (ii) an outer compartment positioned within the outer shell configured to store the LNG, and (iii) a bladder positioned within the outer compartment to expand when the $CO_2$ flows therein, thereby to reduce contamination between the $CO_2$ and the LNG. Insulation is positioned between the outer shell and the outer compartment to provide temperature regulation from external heat sources to reduce boil off of the LNG when positioned in the outer compartment and $CO_2$ in the bladder. One or more pumps are configured to pump the LNG from the one or more dual-fluid storage tanks. One or more articulated rigid loading arms are positioned at a location to connect the LNG carrier to the location. The one or more articulated rigid loading arms are configured to load and unload the LNG including (i) a vapor return line configured to return excess vapor from the LNG to the location and (ii) a dehydration unit connected to the one or more articulated rigid loading arms and configured to remove water from the $CO_2$ when the $CO_2$ is loaded onto the LNG carrier. In certain embodiments, the one or more dual-fluid storage tanks comprises about 80 pounds per square inch gauge (psig) to about 102 psig maximum pressure and about −260 degrees Fahrenheit minimum temperature. In certain embodiments, the one or more dual-fluid storage tanks comprises one or more of spherical tanks, refrigerated tanks, prismatic tanks, cylindrical tanks, or bilobe tanks. In certain embodiments, the one or more dual-fluid storage tanks include one or more temperature-control apparatuses. In certain embodiments, the one or more dual-fluid storage tanks include one or more pressure-control apparatuses. In certain embodiments, the bladder contracts when fluid flows therein. In certain embodiments, if the bladder is partially or substantially empty, the outer compartment fills with nitrogen to stabilize the bladder. In certain embodiments, the one or more dual-fluid storage tanks further includes one or more membranes, waffles, or baffles positioned within each of the one or more dual-fluid storage tanks. In certain embodiments, the one or more dual-fluid storage tanks further comprises one or more sensors, the one or more sensors determine a temperature or a pressure of the LNG and the $CO_2$. In certain embodiments, a liquefaction unit is also positioned at the location to transfer the $CO_2$ to the LNG carrier.

In another embodiment, a method of unloading/loading liquefied gas and $CO_2$ at a location includes the steps of aligning one or more articulated rigid loading arms positioned at a location with one or more dual-fluid storage tanks positioned on a liquefied gas carrier. The one or more dual-fluid storage tanks are positioned on a liquefied gas carrier. The one or more dual-fluid storage tanks include an outer compartment configured to store liquefied gas and a bladder connected to a wall within the outer compartment configured to store $CO_2$. The method also includes the step of connecting each of the one or more articulated rigid loading arms, via a first controller, to the outer compartment or the bladder of each of the one or more dual-fluid storage tanks. If the outer compartment contains liquefied gas, in response to reception of a first liquefied gas pump operation signal from the first controller and a second liquefied gas pump operation signal from a second controller, the method further includes pumping a first liquefied gas from the outer compartment to one or more liquefied gas storage tanks and one of (a) a second liquefied gas from one or more liquefied gas storage tanks to the outer compartment or (b) CO2 from one or more CO2 storage tanks to the bladder. If the bladder contains CO2, in response to reception of a first CO2 signal from the first controller and a signal from a second CO2 signal from the second controller, the method further includes pumping CO2 from the bladder to one or more CO2 storage tanks at the location and the second liquefied gas from one or more liquefied gas storage tanks to the outer compartment.

In another embodiment, a controller for a liquefied gas carrier for transporting liquefied gas and CO2 includes a first input/output in signal communication with one or more temperature-control apparatuses. The controller is positioned within an outer compartment of each of one or more dual-fluid storage tanks on a liquefied gas carrier and a bladder positioned within the outer compartment. The controller is configured to obtain a first temperature of a liquefied gas contained within the outer compartment and a second temperature of CO2 contained within the bladder during unloading operations, unloading operations, and transport of the liquefied gas and CO2. The controller also includes a second input/output in signal communication with one or more pressure-control apparatuses positioned within the outer compartment of each of one or more dual-fluid storage tanks and the bladder. The controller is configured to obtain a first pressure of the liquefied gas contained within the outer compartment and a second pressure of CO2 contained within the bladder during the unloading operations, the loading operations, and the transport of the liquefied gas and CO2. The controller also includes a third input/output in signal communication with a first flow meter positioned at a first inlet of the outer compartment and a second flow meter positioned at a second inlet of the bladder. The controller is configured to measure a first flow rate of the liquefied gas and a second flow rate of the CO2. The controller further includes a fourth input/output in signal communication with a first control valve. The first control valve is designed to adjust flow of the liquefied gas via one or more unloading/loading pumps positioned on the liquefied gas carrier thereby modifying the first flow rate of the liquefied gas and a second control valve. The second control valve is designed to adjust flow of the CO2 via the one or more unloading/loading pumps thereby modifying the second flow rate. The controller is configured to, after initiation of the unloading operations or the loading operations, determine whether the first flow rate or the second flow rate will be modified based on an outer compartment temperature, an outer compartment pressure, a bladder pressure, or a bladder temperature. In response to a determination that the first flow rate is to be modified, the controller adjusts a position of the first flow control valve that adjusts flow of the liquefied gas, thereby modifying the first flow rate. The controller may also in response to a determination that the second flow rate is to be modified adjust a position of the second flow control valve that adjusts flow of the CO2, thereby modifying the second flow rate.

The controller may make a determination of whether the first flow rate or the second flow rate will be modified based on a first amount of the liquefied gas within the outer compartment and a second amount of the CO2 within the bladder. The controller may make a determination of whether the first flow rate or the second flow rate are to be modified is based on a third amount of the liquefied gas within one or more liquefied gas storage tanks positioned at a location and a second amount of the CO2 within one or more CO2 storage tanks.

BRIEF DESCRIPTION OF DRAWINGS

These embodiments and other features, aspects, and advantages of the disclosure will be better understood in conjunction with the following descriptions, claims, and accompanying drawings. It is to be noted, however, that the drawings illustrate only certain embodiments of the disclosure and, therefore, are not to be considered limiting of the scope of the disclosure. The disclosure includes any combination of one or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

FIG. 4A-4H are illustrative diagrams of different phases of unloading/loading liquefied gases and CO2 within one or more dual-fluid storage tanks, according to an embodiment of the disclosure.

FIG. 6 is a simplified block diagram for unloading/loading liquefied gas and carbon dioxide in an LNG carrier, according to an embodiment of the disclosure.

DETAILED DESCRIPTION

Figure 1:
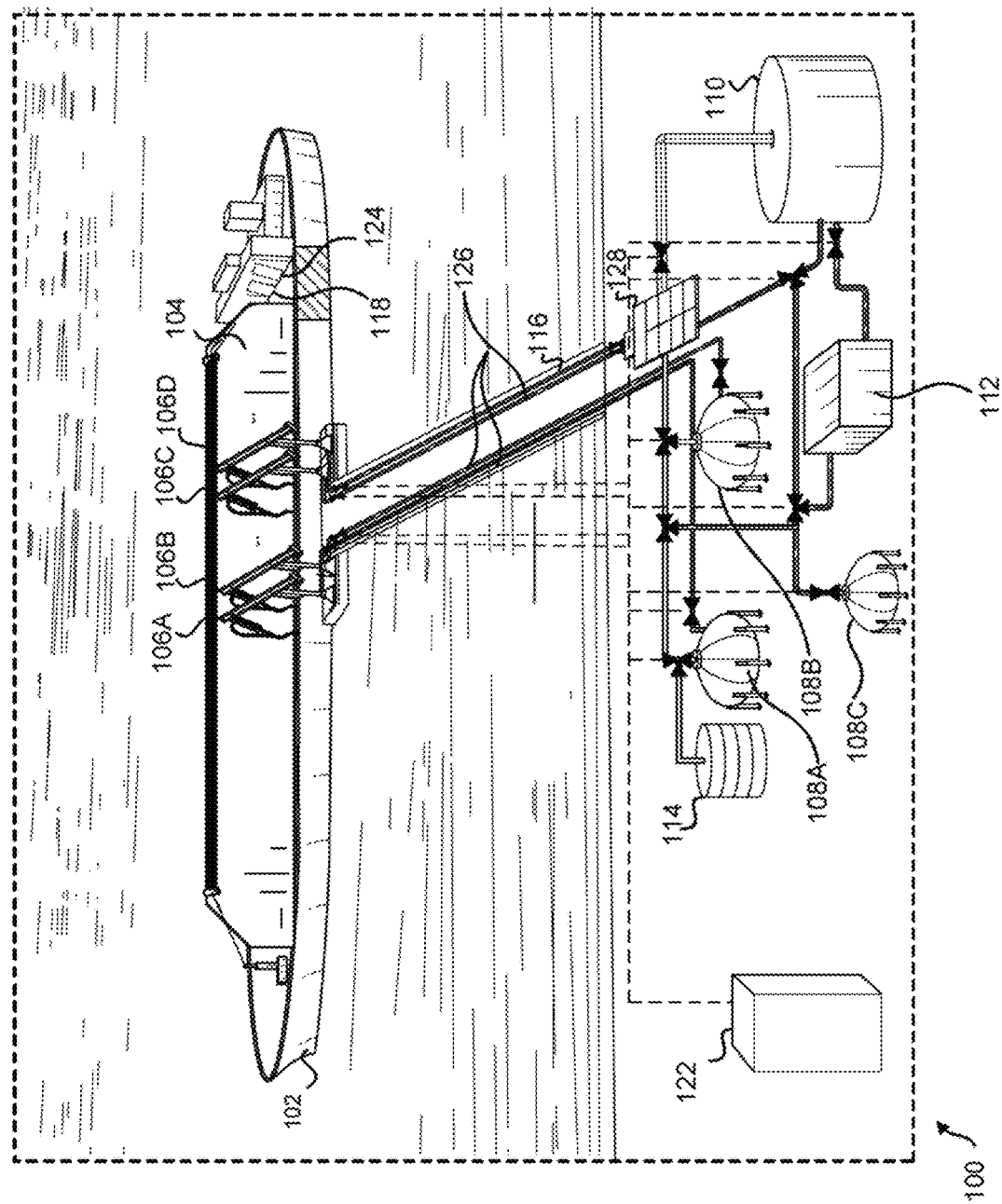
FIG. 1 is an illustrative diagram of a prismatic liquefied gas carrier stationed at a terminal, according to an embodiment of the disclosure.

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the embodiments of the systems and methods disclosed herein and are therefore not to be considered limiting of the scope of the systems and methods disclosed herein as it may include other effective embodiments as well.

Although specific terms are employed herein, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

Provided here are systems and methods to address these shortcomings of the art and provide other additional or alternative advantages. The disclosure herein provides several embodiments of a liquefied gas carrier configured to transport liquefied gas and carbon dioxide (CO2) in a dual-transport system. The liquefied gas carrier may be a new build or a retrofit of an existing vessel. A liquefied gas carrier may transport liquefied gas to a location and transport CO2 from the same location back to the original location. In this manner, the liquefied gas carrier maximizes the available capacity in all phases of transport. In certain embodiments, the liquefied gas carrier may be a liquefied petroleum gas (LPG) carrier or a liquefied natural gas (LNG) carrier configured to transport liquefied gas and CO2. The liquefied gas may be LNG, LPG, liquid nitrogen, liquid air, or other types of liquefied gases transported via such carriers. In certain embodiments, as illustrated in FIGS. 1-8, for example, the present disclosure is directed to systems and methods for transporting liquefied gas and CO2 on a liquefied gas carrier.

A liquefied gas carrier may contain or include one or more dual-fluid storage tanks. Each of the one or more dual-fluid storage tanks may have (a) a prismatic design, (b) a membrane design, or (c) a moss spherical design. A moss spherical design may use hull space more efficiently than other tank designs. Additionally, the moss spherical design may withstand higher pressure and utilize a lesser metal hull or wall thickness than cylinders while handling the same or even higher pressures. The liquefied gas carrier may have five spheres, tanks, or containers. In other embodiments, the liquefied gas carrier may include more or fewer than five spheres. Each sphere, tank, or container may be designed to be about 1.5 inches thick (for example, as described in American Society of Mechanical Engineers (ASME) VIII code) with a diameter from about 100 feet (ft) to about 140 ft and weigh about 1400 megatons (MT) each. This includes about 1/8 inch of corrosion allowance and an about 5% overage to account for support structure. Each sphere, tank, or container may be designed to hold a volume of about 150,000 cubic meters (m3).

Other configurations of the dual-fluid storage tanks may include refrigerated tanks, cylindrical tanks, and bilobe tanks. The material used in the one or more dual-fluid storage tanks design may be aluminum, balsa wood, plywood, invar, nickel steel, and/or stainless steel, such as 517 A. The design and material of the one or more dual-fluid storage tanks may be chosen or selected depending on a specified temperature and pressure of the liquid gas and CO2 during transportation.

The one or more dual-fluid storage tanks may be fully pressurized tanks, semi-pressurized tanks, fully refrigerated tanks, or some combination thereof. A carrier with fully pressurized tanks may include a number of horizontal cylindrical or spherical tanks that are fitted to carry large amounts of gas. Semi-pressurized tanks may carry liquid gases at low temperatures as compared to other configurations or types of tanks. Such semi-pressurized tanks may be cylindrical, spherical, or bilobe tanks in shape. Refrigerated tanks may carry liquefied gas at even lower temperatures and maintain such temperatures during transport. Refrigerated tanks may be prismatic in shape.

In embodiments, the one or more dual-fluid storage tanks may be classified as an independent Type 'A', independent Type 'B', independent Type 'C', or membrane type tanks. Independent Type 'A' are fully refrigerated tanks, independent Type 'B' are spherical or prismatic tanks that have a partial secondary barrier for a fail-safe design, independent Type 'C' are fully pressurized tanks, and membrane are non-self-supported tanks surrounded by a complete double hull structure.

FIG. 1 is an illustrative diagram of a prismatic LNG carrier stationed at a terminal. In certain embodiments, the dual-fluid transport system 100 includes or comprises a liquefied gas carrier, such as an LNG carrier or liquefied gas carrier 102 configured to transport LNG (and/or, in some embodiments, other liquefied gases) and CO2. The LNG carrier contains or includes one or more dual-fluid storage tanks 104 positioned at and/or along a center-line of the LNG carrier and configured to store and transport the LNG and/or the CO2. The liquefied gas carrier 102 may be configured to maximize the liquefied gas carrier's capacity to transport liquefied gas and CO2, thereby improving transportation efficiency. The liquefied gas carrier 102 may transport liquefied gas, CO2, or both at all times. The liquefied gas carrier may deliver liquefied gas and/or CO2 to a location and may return with a different liquefied gas and/or CO2. Typically, the liquefied gas carrier 102 returns empty after delivery of the liquefied gas, which wastes time, money, and, further, is not carbon neutral friendly. The liquefied gas carrier 102 described herein contributes to a reduction in carbon footprint by improving efficiency based on being able to transport liquid gas and/or CO2 during a return trip, rather than being empty.

The one or more dual-fluid storage tanks 104 contain or include an outer shell. An outer compartment is positioned within the outer shell. The outer compartment is configured to store the LNG. A bladder is positioned within the outer compartment. The bladder may be configured to expand when the CO2 flows therein. The bladder may be present to reduce contamination between the CO2 and the LNG. Insulation may be positioned between the outer shell and the outer compartment to provide temperature regulation from external heat sources to reduce boil off of the liquefied gas, such as LNG, stored or contained in the outer compartment and CO2 stored or contained in the bladder.

In some embodiments, the outer compartment may be configured to store CO2 and the bladder may be configured to store LNG or another liquid gas. In yet another embodiment, the outer compartment and the bladder may both be configured to store liquefied gas and CO2, the liquefied gas and the CO2 being stored in the outer compartment and bladder separately and at different times.

LNG may be transported at a temperature ranging from about −260 degrees Fahrenheit (° F.) to about −240° F. LNG may be transported at a pressure ranging from about 2 pounds per square inch gauge (psig) to about 5 psig. In certain embodiments, CO2 may be stored as liquid CO2. To maintain CO2 in a liquid form, the temperature of CO2 may be maintained below the critical point and above the triple point, as well as within a threshold pressure range, as will be understood by one skilled in the art. CO2 may be transported at a temperature ranging from about −76° F. and −87° F. CO2 may be transported at a pressure ranging from about 85 psig to about 107 psig. LPG may be transported at a temperature ranging from about −54° F. to about −22° F. LPG may be transported at atmospheric pressure. In some embodiments, the liquefied gas may be chilled to a temperature for the liquefied gas to remain a liquid gas. For dual transport of liquefied gas and CO2, the CO2 may be stored in the bladder (or in other embodiments, the outer compartment) with another fluid, such as nitrogen. In such embodiments, the concentration of CO2 in relation to the other fluid may be less than 50 parts per million (ppm) to eliminate, substantially eliminate, and/or mitigate the risk of solidification.

Liquefied gas may be unloaded from the liquefied gas carrier 102 at a location and CO2 may be loaded to the same liquefied gas carrier 102 at the same location. CO2 may be unloaded from the liquefied gas carrier 102 at a location and liquefied gas may be loaded to the same liquefied gas carrier 102 at the same location.

Liquefied gas may be unloaded from the liquefied gas carrier 102 at a first location, the liquid gas carrier 102 may then travel to a second location to load CO2, the CO2 to be delivered to a third location or back to the first location. The liquefied gas carrier 102 may be loaded with liquefied gas to transport the liquefied gas to various locations in between delivery of CO2 to a third location, a fourth location, and so on. CO2 may be unloaded from the liquefied gas carrier 102 at a first location, the liquefied gas carrier 102 may then travel to a second location to receive or load liquefied gas for delivery of the liquefied gas to a third location or back to the first location. The liquefied gas carrier 102 may receive or load CO2 for transport and transport the CO2 to various locations in between delivery of the liquefied gas to a third location, a fourth location, and so on. In such embodiments, the liquefied gas carrier 102 makes use of the liquefied gas carrier's 102 entire travel route thereby increasing efficiency or carbon efficiency. Thus, the liquefied gas carrier 102, based on such an increase in efficiency or carbon efficiency, decreases its carbon footprint by utilizing the capacity of the liquefied gas carrier 102.

In embodiments, different types of bladders may be utilized, such as, for example, a low pressure bladder and/or an expanding bladder. A low pressure bladder may isolate different liquid gases. The dual-storage tank walls may be contacted with the CO2 filled in the bladder. In such embodiments, the dual-storage tank may be designed or configured to hold fluid at a pressure of about 80 psig to about 107 psig.

The bladder may be constructed from polymers including elastomers or thermoplastic polymers. Such polymers may include FF202, EPDM, PEEK, Nylon, Neoprene, PTFE, Viton, EPR, and Buna N, among other similar polymers with similar properties, as will be understood by one skilled in the art. The bladder may be constructed of elastomer material such as perfluoroelastomer material that can withstand the low-temperature and high pressure of the CO2. Suitable elastomers may have reduced swelling properties under pressure. Such elastomers may also be able to withstand the lower temperatures at which liquefied gas may be stored, such as about −260° F. The elastomers may also be able to withstand variation in temperatures of different liquefied gases. The bladder may be designed in a donut-shape, such that the bladder may circle around a pipe tower used to load and unload the liquid gases to and from, respectively, the outer compartment or bladder.

Insulation positioned between the outer shell and the outer compartment may be used to reduce boil-off. The insulation may be foam insulation, perlite insulation, fiber glass blanket insulation, or other types of insulation that may protect the liquefied gases from the dual-storage tank material.

In some embodiments, the one or more dual-fluid storage tanks may have membranes, waffles, or baffles. The membranes, waffles, or baffles may be used to accommodate thermal expansion and contraction of the liquefied gases. The membranes, waffles, or baffles may be installed along the lower wall or portion of the outer shell of the dual-fluid storage tank. The membranes, waffles, or baffles may be fixedly or removably attached to the lower wall, top wall, left side wall, right side wall, or a portion of the outer shell of each of the one or more dual-fluid storage tanks. Such an attachment may be mechanical (for example, such as, via fasteners or welds). As the bladder expands, the bladder may press against the baffles. The baffles, in such examples, may stabilize the bladder when the bladder is partially and/or completely full. The membranes, waffles, or baffles may cover the full-length of each of the one or more dual-fluid storage tanks. The membranes, waffles, or baffles may be assembled in multiple portions to cover one or more lower wall, top wall, left side wall, or right side wall of the one or more dual-fluid vessel.

In some embodiments, the liquefied gas carrier 102 may have a water ballast system to balance the liquefied gas carrier's weight. The liquefied gas carrier 102 may load/deballast and unload/ballast simultaneously. In some embodiments, the liquefied gas carrier 102 may be designed to be ballast-free yet built to balance the liquefied gas carrier's 102 weight.

To maintain the liquid gas in a liquid state, the one or more dual-fluid storage tanks may be temperature-controlled. In certain embodiments, the one or more dual-fluid storage tanks may include and/or connect to one or more temperature-control apparatuses. The one or more temperature-control apparatuses may include temperature sensors, a refrigeration unit, a reliquification unit, the water ballast system, and/or other temperature-control apparatuses or devices as will be understood by one skilled in the art. If the liquid boils during transportation, as indicated by signals received by the one or more temperature control apparatuses from one or more temperature sensors positioned at varying locations within the one or more dual-fluid storage tanks, then the one or more dual-fluid storage tanks temperature may be controlled by the one or more temperature-control apparatuses. If the temperature rises (for example, above a selected threshold), as indicated by signals received by the one or more temperature control apparatuses from one or more temperature sensors positioned at varying locations within the one or more dual-fluid storage tanks, the one or more temperature-control apparatuses may signal to a control system and/or a refrigeration unit to cool the liquefied gas to maintain the state of the liquefied gases. If the temperature goes or falls below a minimum threshold or selected threshold, as indicated by signals received by the one or more temperature control apparatuses from one or more temperature sensors positioned at varying locations within the one or more dual-fluid storage tanks, then the one or more temperature-control apparatuses may signal to a control system and/or refrigeration unit to heat the liquid to maintain the state of the liquefied gases.

In some embodiments, multiple purging cycles may be used when the liquefied gas carrier 102 does not have or include a bladder or another means of isolation. In such embodiments, the outer compartment may contain or hold the liquid gas. Between unloading and loading of different liquid gases, the outer compartment may be purged for one or more cycles. The purging cycles may be used to prevent cross contamination between liquid gases. In such embodiments, one or more nitrogen or other gas tanks positioned on the liquefied gas carrier 102 and proximal to the one or more dual-fluid storage tanks may perform or may be utilized to purge the one or more dual-fluid storage tanks. Further the nitrogen or other gas tanks may store an amount of hydrogen and/or other gas or liquefied gas suitable for purging CO2 and/or other liquefied gases, as will be understood by one skilled in the art.

To maintain the liquid gas in a liquid state, in addition to or rather than temperature control, the one or more dual-fluid storage tanks may be pressure-controlled. In certain embodiments, the one or more dual-fluid storage tanks may include and/or connect to one or more pressure-control apparatuses. The pressure-control apparatus may include pressure sensors, a ballast system, and/or other pressure-control apparatuses or devices. As the pressure changes and/or changes to a pressure outside of a selected threshold range, as indicated by signals received by the one or more pressure control apparatuses from one or more pressure sensors positioned at varying locations within the one or more dual-fluid storage tanks, then the pressure pressure-control apparatus may increase or decrease the pressure within the one or more dual storage tanks to drive the pressure to within the selected threshold range. In some embodiments, the pressure in the one or more dual storage tanks may be maintained within a pressure range by burning the liquid as fuel in the boilers of the liquefied gas carrier.

Separate pumps, piping and loading/unloading equipment may be used to reduce the risk of cross contamination. In addition to minimizing the risk of cross contamination, different pumps and piping may be utilized due to the differences in specific gravity of the liquid gases, for example, up to a 1.2 specific gravity for CO2 and less than a 0.5 specific gravity for LNG.

The system 100 may include one or more pumps 118 that are configured to pump the liquefied gas from the one or more dual-fluid storage tanks 104. System 100 also includes one or more articulated rigid loading arms 106A, 106B, 106C, and 106D positioned at a location and configured to connect to the liquefied gas carrier 102, thereby connecting the liquefied gas carrier to the location or equipment (such as tanks or storage tanks) at the location. The one or more articulated rigid loading arms 106A, 106B, 106C, and 106D are configured to load and unload the LNG (or other liquefied gas) and/or CO2 from the liquefied gas storage tanks 108A, 108B, 108C or CO2 storage tanks 110, respectively. The one or more articulated rigid loading arms 106A, 106B, 106C, and 106D are connected to a vapor return line 116. The vapor return line 116 is configured to return excess CO2 to CO2 storage tanks 110 positioned at the location. One or more articulated rigid loading arms 106A, 106B, 106C, and 106D are connected to a liquid return line 126 to transport liquefied gas, such as LNG, from the liquefied gas storage tanks 108 to the one or more dual-fluid storage tanks 104 or CO2 from the CO2 storage tanks 110 to the bladder in the one or more dual-fluid storage tanks 104. The liquid return line 126 may also transport liquefied gas from one or more dual-fluid storage tanks 104 to the liquefied gas storage tanks 108 or the CO2 from the bladder in the one or more dual-fluid storage tanks 104 to the CO2 storage tanks 110. A header 128 may be positioned to route the liquid return line 126 or the vapor return line 116 to a corresponding return tank.

A liquefaction unit 112 is positioned at the location and is configured to liquefy any gas or any liquefied gas that changes state to a gas that is delivered to the location. A dehydration unit 114 is also connected to the one or more articulated rigid loading arms. The dehydration unit 114 is configured to remove water from the liquid gases when the liquid gases are loaded onto the LNG carrier 102.

As described herein, the one or more dual-fluid storage tanks 104 may operate about 80 pounds per square inch gauge (psig) to about 102 psig and about −260 degrees Fahrenheit.

The LNG carrier 102 may contain a first control room 124 that contains a first controller to control the unloading/loading operations of CO2 and liquefied gas. The first controller may control temperature-control apparatuses, pressure-control apparatuses, flow meters, control valves, pumps, bladder dynamics, and nitrogen blankets used to stabilize the bladder. The first controller may also be in communication with a second controller located within a location control room 122 at the location to control unloading/loading operation of CO2 and liquefied gas to/from CO2 storage tanks and liquefied gas storage tanks. The first controller may be in signal communication with the second controller (for example, via a wireless connection). The system 100 may contain or include a supervisory controller that controls the first controller and/or the second controller and may communicate and/or control communication between the multiple controllers. In an embodiment, the first controller or the second controller may be a supervisory controller.

One or more valves (the one or more valves for example, positioned along the liquid return line 126, within one or more articulated rigid loading arms 106A, 106B, 106C, and 106D, or elsewhere in the dual-fluid transport system 100) may be controlled by the first controller and/or the second controller to control the flow of the liquefied gas, such as LNG and the CO2. The second controller may send a signal to the one or more valves to open or close to direct flow of the liquefied gas and CO2. The one or more valves may be used to direct the LNG flow from the one or more dual-fluid storage tanks 104 on the liquefied gas carrier 102 to the one or more liquefied gas storage tanks 108A, 108B, 108C. The one or more valves also may be used to direct the CO2 flow from the bladder to the one or more CO2 storage tanks 110. The one or more valves may direct LNG flow from the one or more liquefied gas storage tanks 108A, 108B, 108C to the one or more liquefied gas storage tanks 108A, 108B, 108C. The one or more valves may direct CO2 from the one or more CO2 storage tanks 110 to the bladder.

Figure 2:
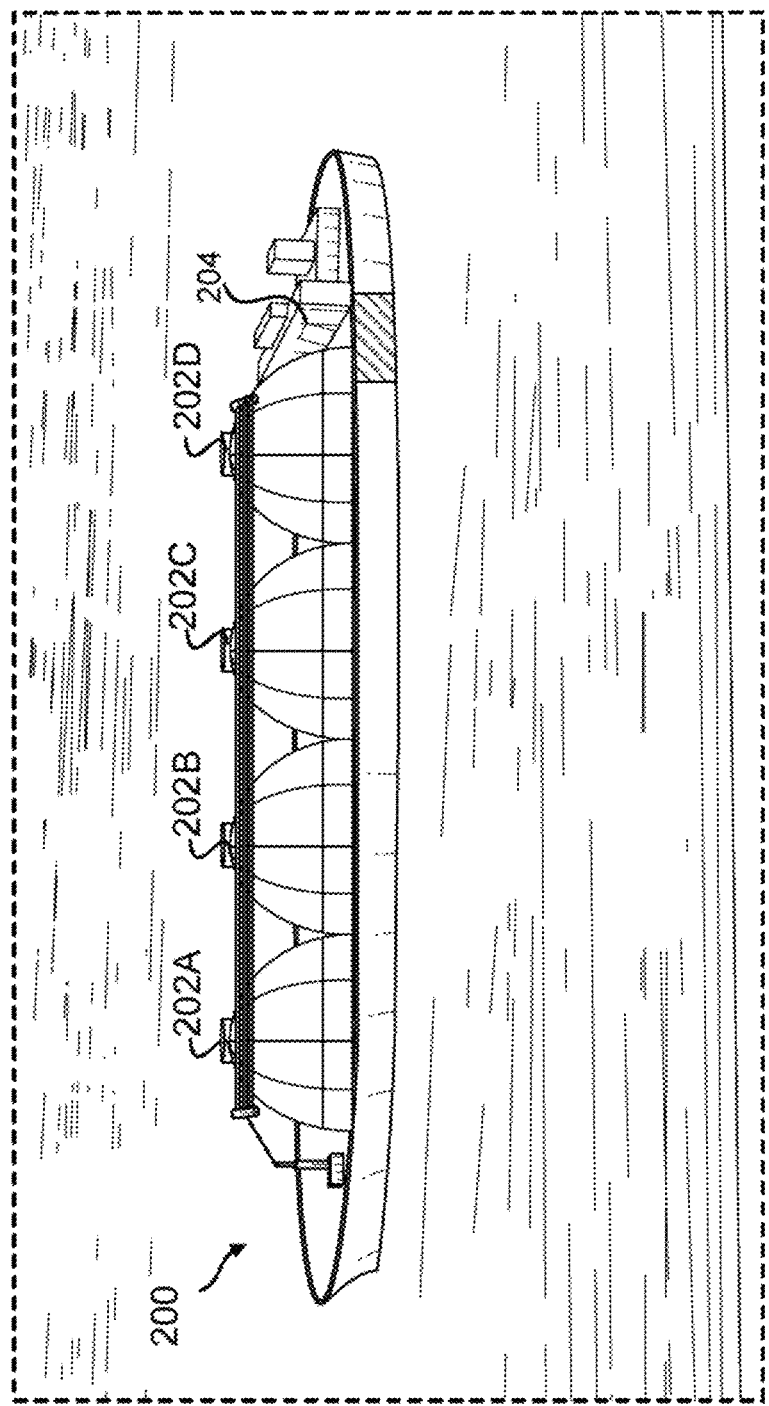
FIG. 2 is an illustrative diagram of a spherical liquefied gas carrier, according to an embodiment of the disclosure.

FIG. 2 is an illustrative diagram of a spherical liquefied gas carrier. In certain embodiments, a liquefied gas carrier 200 may be configured to transport liquefied gas and CO2. The liquefied gas carrier 200 contains one or more dual-fluid storage tanks 202A, 202B, 202C, and 202D positioned on the liquefied gas carrier to transport LNG and/or CO2. The one or more dual-fluid storage tanks 202A, 202B, 202C, and 202D may be positioned at a center-line of the liquefied gas carrier 200.

The one or more dual-fluid storage tanks 202A, 202B, 202C, and 202D may be compatible with and/or configured to store liquefied gases having different boiling points, critical points, and volatility.

The liquefied gas carrier 200 may contain or include a control room 204 having an unloading/loading controller to control the unloading/loading operations of CO2 and liquefied gas. The unloading/loading controller may control temperature-control apparatuses, pressure-control apparatuses, flow meters, control valves, pumps, bladder dynamics, and nitrogen blankets used to stabilize the bladder. The controller also may be in communication with a land controller at the location to control unloading/loading operation of CO2 and liquefied gas to/from CO2 storage tanks and liquefied gas storage tanks. The unloading/loading controller may communicate wirelessly with the land controller. The system 200 may contain a supervisory controller that controls the unloading/loading controller and the land controller at the location and may control communication between the unloading/loading controller and the land controller. In an embodiment, the unloading/loading controller may be the supervisory controller or the land controller may be the supervisory controller.

Figure 3A:
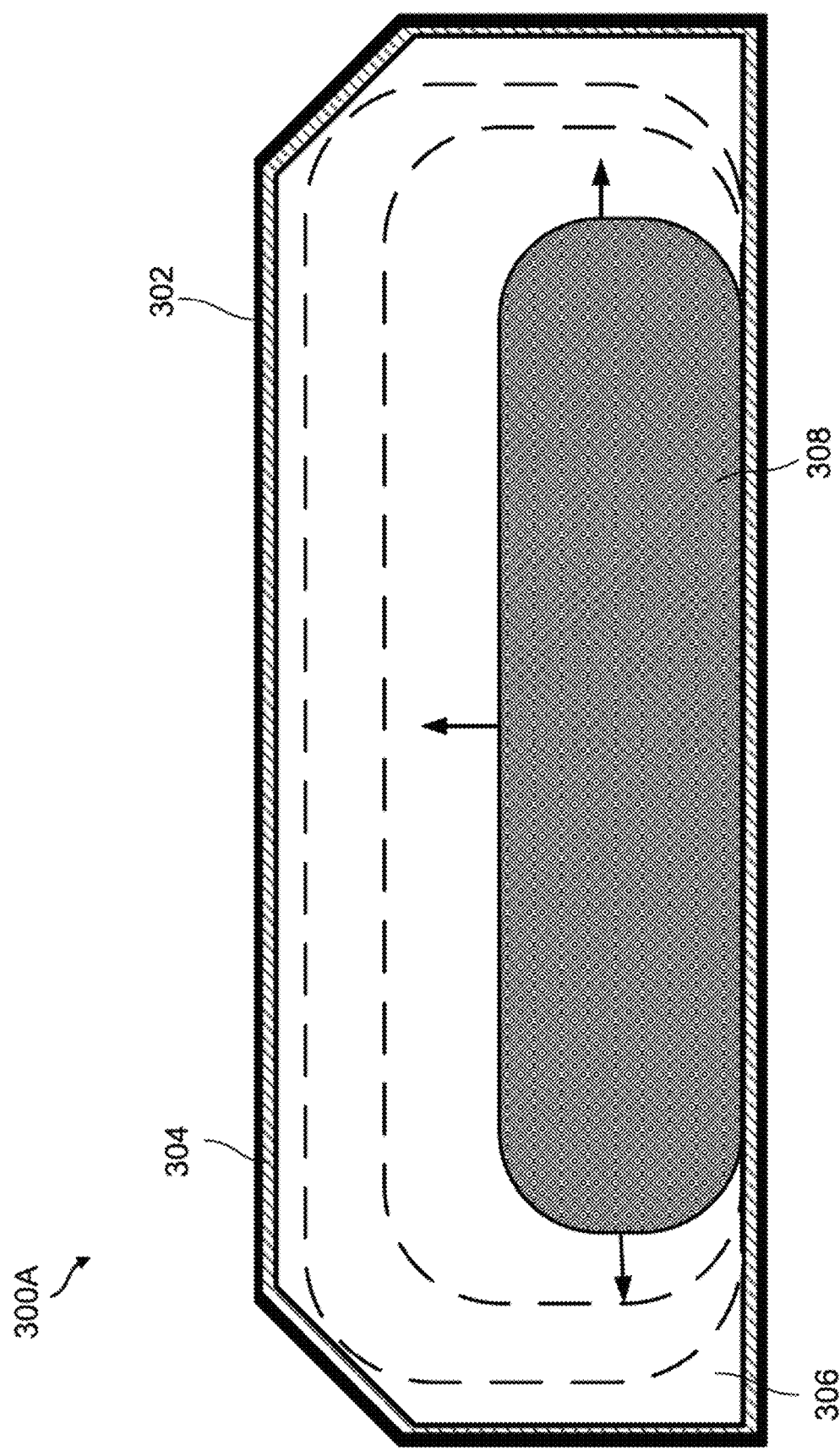
FIG. 3A is an illustrative diagram of a prismatic tank with a vertically expanding inner bladder, according to an embodiment of the disclosure.
Figure 3B:
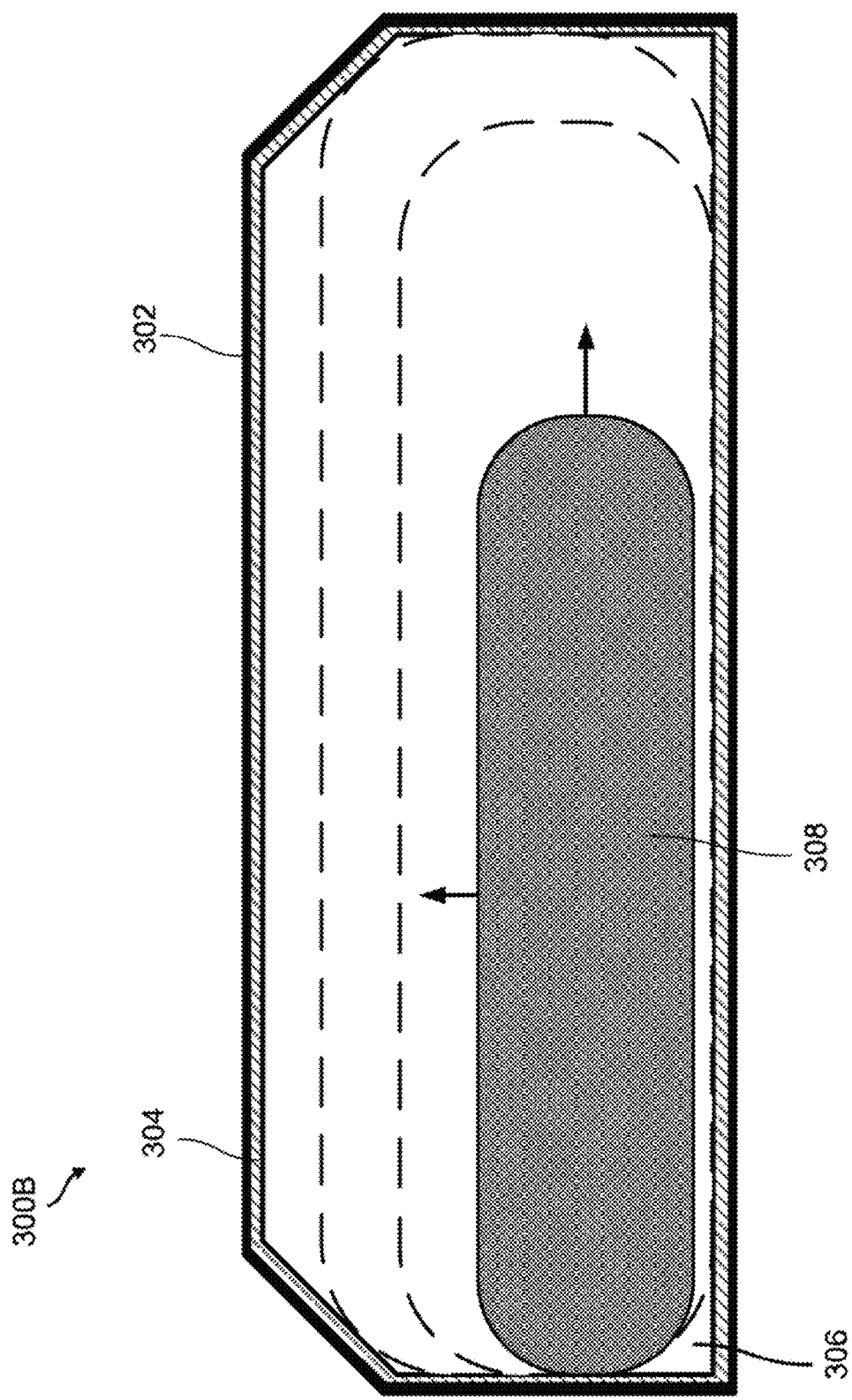
FIG. 3B is an illustrative diagram of a prismatic tank with a horizontally expanding inner bladder, according to an embodiment of the disclosure.
Figure 3C:
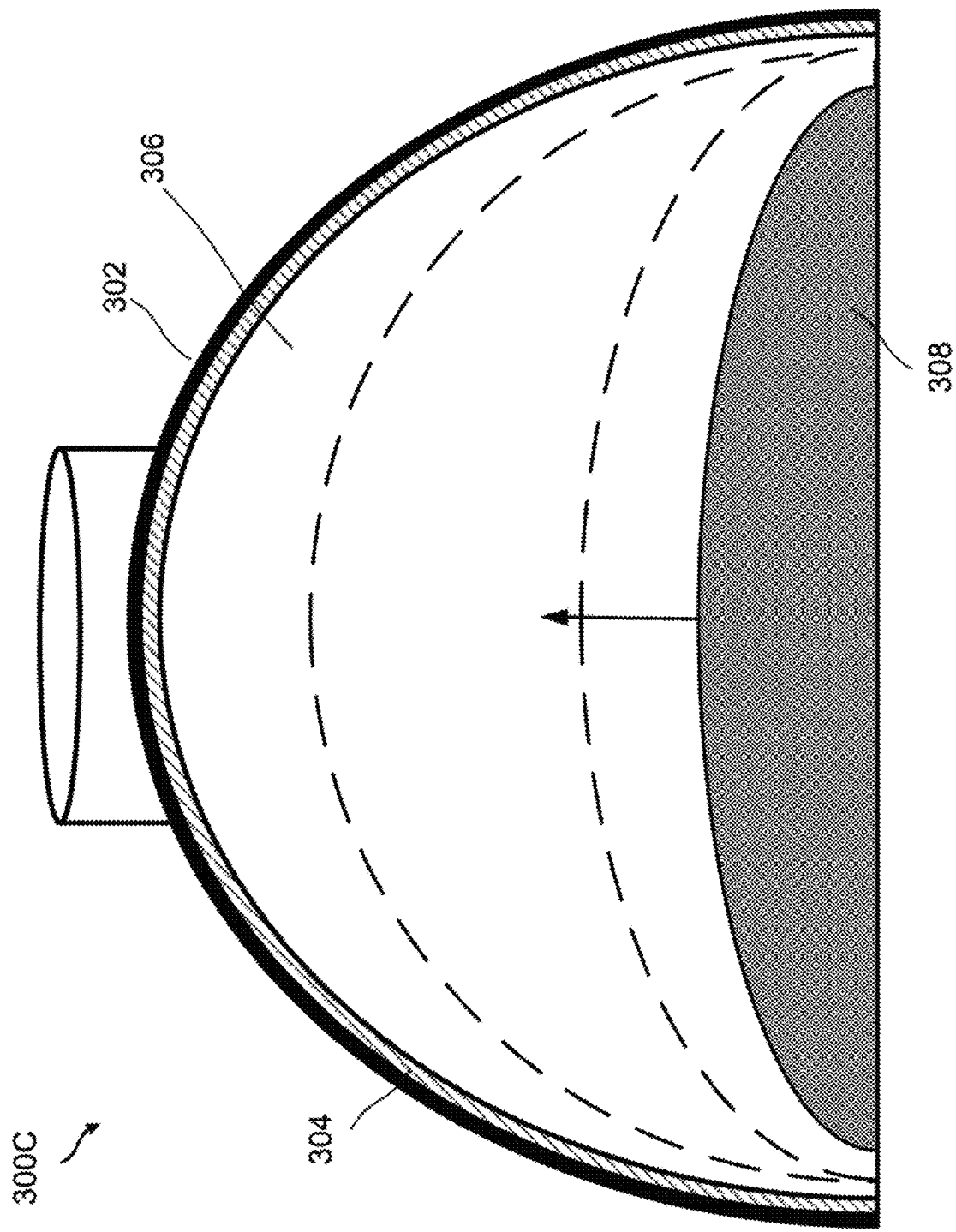
FIG. 3C is an illustrative diagram of a spherical tank with a vertically expanding inner bladder, according to an embodiment of the disclosure.

The one or more dual-fluid storage tanks are illustrated in FIGS. 3A-3C. FIG. 3A is an illustrative diagram of a prismatic tank with a vertically expanding inner bladder attached therein. In the embodiment, the one or more dual-fluid storage tanks 300A has an outer shell 302. Each of the one or more dual-fluid storage tanks may have lower wall, top wall, left side wall, and right side wall. An outer compartment 306 is positioned within the outer shell 302. The outer compartment 306 is configured to store the liquefied gas. A bladder 308 is positioned within the outer compartment 306. The bladder 308 is configured to expand when the CO2 the flows therein, thereby to reduce contamination between the CO2 and the liquefied gas. The bladder may be used as a means of isolation to reduce the risk of cross contamination between liquid gases. Insulation 304 is positioned between the outer shell 302 and the outer compartment 306 to provide temperature regulation from external heat sources to reduce boil off of the liquefied gas when positioned in the outer compartment 306 and CO2 when positioned in the bladder 308. External heat sources may be the sun, reflected sunlight from planets and moons, heating by friction when traveling through an atmosphere or gas cloud, or other heat as will be understood by one skilled in the art.

FIG. 3A illustrates the bladder 308 at a bottom wall of the prismatic tank. The dual-fluid storage tank 300A may have an outer shell and insulation 304 connected to the inner surface of the outer shell 302. The bladder 308 may expand vertically within the outer compartment 306 when the CO2 is positioned therein. The bladder 308 may expand horizontally within the outer compartment 306 when the CO2 is positioned therein. Alternatively, the bladder 308 may be contractible when fluid is not positioned therein. The bladder 308 may connect, attach, or be mounted to an inner surface of each side wall. The mounts or plates attached to the inner surface of each side wall may be attached mechanically, such as via fasteners (for example, via welds, bolts). Other configurations of the dual-fluid storage tanks may include similar mountings, such as the dual-fluid storage tank illustrated in FIG. 3B (e.g., the bladder mount on the inner surface of the bottom wall of the dual-fluid vessel). The bladder may be expandable vertically within the outer compartment. FIG. 3C is an illustrative diagram of an expandable bladder 308 within a spherical tank 300C. The bladder 308 may be mounted to each side wall to expand vertically or horizontally.

In some embodiments, as the bladder expands within the one or more dual storage tanks, the bladder may expand around a pipe tower within each of the one or more dual storage tanks. The pipe tower may be used to load or unload the liquid gas from each of the one of more dual storage tanks.

Given that the liquefied gas carrier may provide transportation of the one or more dual-fluid storage tanks over long distances in a body of water, stability of the bladder may prevent damage to the bladder or to the outer compartment. In some embodiments, the outer compartment is filled with nitrogen to stabilize the bladder. In some embodiments, the liquefied gas carrier may contain onboard nitrogen vessels to equalize the pressure between the bladder and the outer compartment. One or more pressure sensors may be positioned within the bladder and/or outer compartment. The one or more pressure sensors may sense, measure, or determine the pressure within the bladder and/or outer compartment and provide such measurements to a controller or control system. The controller or control system may, in response to a pressure that is outside of a threshold range, release nitrogen into the outer compartment to equalize pressure.

FIG. 4A-4H is an illustrative diagram of different phases of unloading/loading liquefied gases and CO2 within one or more dual-fluid storage tanks. As illustrated in FIG. 4A, a dual-fluid storage tank 402 may be filled with liquefied gas in the outer compartment 406. The bladder 404 may be empty. In FIG. 4B, the amount of liquefied gas in the outer compartment 406 is less than the amount of liquefied gas as illustrated in FIG. 4A. As the liquefied gas is continuously removed from the outer compartment 404, the outer compartment is emptied, as illustrated in FIG. 4C. With an empty outer compartment 404, the bladder 404 may be filled with CO2, as illustrated in FIG. 4D. In FIG. 4E and FIG. 4F, CO2 is continuously added into the bladder 404. In FIG. 4G, the bladder 404 expands to fill the entire outer compartment 406. In FIG. 4H, a blanket of nitrogen is added to the outer compartment 406 to stabilize the bladder 404 during transport.

Figure 5:
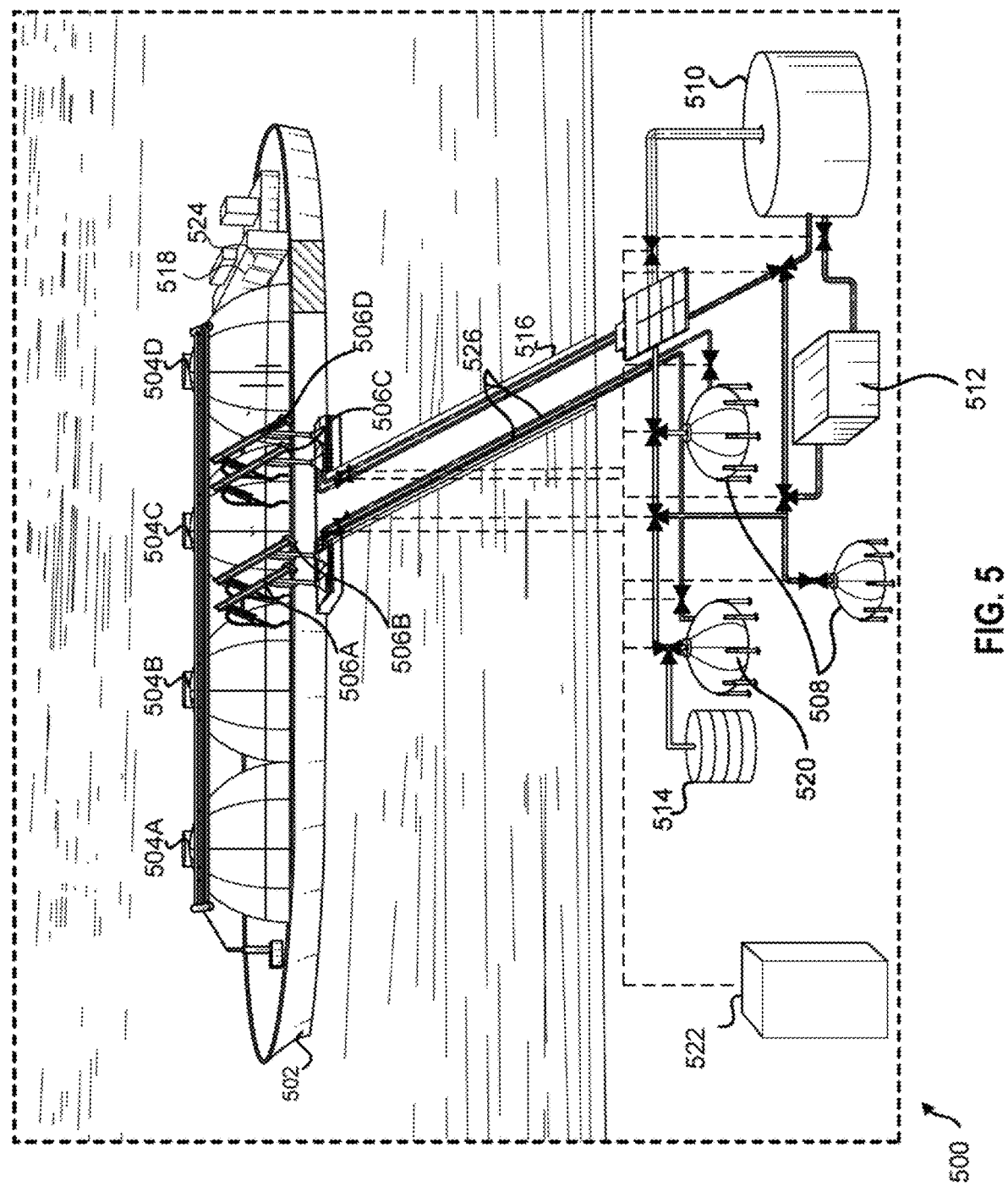
FIG. 5 is an illustrative diagram of a spherical liquefied gas carrier stationed at a terminal, according to an embodiment of the disclosure.

FIG. 5 is an illustrative diagram of a spherical liquefied gas carrier stationed at a terminal. The one or more dual-fluid storage tanks 504A, 504B, 504C, and 504D may include one or more of spherical tanks. In the embodiment, CO2 may be liquid CO2. In other embodiments, the one or more dual-fluid storage tanks 504A, 504B, 504C, and 504D contain membranes, waffles, or baffles. The membranes, waffles, or baffles may act as a secondary containment system, in the event of the dual-fluid storage tank leakage. The membrane, waffle, or baffle used in the dual-fluid storage tank may depend on the tank shape and the type of liquid gas carried in the one or more dual-fluid storage tanks. In some embodiments, the membranes, waffles, or baffles may partially-cover the length of each of the one or more dual-fluid tanks. In other embodiments, the membranes, waffles, or baffles may cover the full-length of each of the one or more dual-fluid tanks.

The system 500 may include one or more pumps 518 that are configured to pump the liquefied gas from the one or more dual-fluid storage tanks 504A, 504B, 504C, and 504D. System 500 further includes one or more articulated rigid loading arms 506A, 506B, 506C, and 506D positioned at a location to connect the liquefied gas carrier 502 to the location. The one or more articulated rigid loading arms 506A, 506B, 506C, and 506D are configured to load and unload the liquefied gas and/or CO2 from the liquefied gas storage tanks or CO2 storage tanks, respectively. The vapor return line 516 is connected to the one or more articulated rigid loading arms 506A, 506B, 506C, and 506D and is configured to return excess CO2 to CO2 storage tanks 510 positioned at the location. One or more articulated rigid loading arms 506A, 506B, 506C, and 506D are connected to a liquid return line 526 to transport liquefied gas from the liquefied gas storage tanks 508 to the one or more dual-fluid storage tanks 504A, 504B, 504C, and 504D or CO2 from the CO2 storage tanks 510 to the bladder in the one or more dual-fluid storage tanks 504A, 504B, 504C, and 504D. The liquid return line 526 may also transport liquefied gas from one or more dual-fluid storage tanks 504A, 504B, 504C, and 504D to the liquefied gas storage tanks 508 or the CO2 from the bladder in the one or more dual-fluid storage tanks 504A, 504B, 504C, and 504D to the CO2 storage tanks 510.

A liquefaction unit 512 is positioned at the location and is configured to liquefy any gas or any liquefied gas that changes state to a gas that is delivered to the location. A dehydration unit 514 is also connected to the one or more articulated rigid loading arms. The dehydration unit 514 may be configured to remove water from the liquid gases when the liquid gases are loaded onto the liquefied gas carrier 502.

As described herein, the one or more dual-fluid storage tanks 504A, 504B, 504C, and 504D may operate from about 80 pounds per square inch gauge (psig) to about 102 PSI and at a minimum temperature of about −260 degrees Fahrenheit.

The liquefied gas carrier 504 may contain a first control room 524 having a first controller to control the unloading/loading operations of CO2 and liquefied gas. The first controller 524 may control temperature-control apparatuses, pressure-control apparatuses, flow meters, control valves, pumps, bladder dynamics, and nitrogen blankets used to stabilize the bladder. The first controller may also be in communication with a second controller located within a location control room 522 at the location to control unloading/loading operation of CO2 and liquefied gas to/from CO2 storage tanks and liquefied gas storage tanks, respectively. The first controller may communicate wirelessly with the second controller. The second controller may send a signal to the one or more valves to open or close to direct flow of the liquefied gas and CO2. The system 500 may contain a supervisory controller that controls the first controller and the second controller to communicate between the multiple controllers. The first controller or the second controller may be a supervisory controller.

A method of unloading/loading liquefied gas and carbon dioxide (CO2) at a location may include aligning one or more articulated rigid loading arms positioned at a location with one or more dual-fluid storage tanks positioned on a liquefied gas carrier. The one or more dual-fluid storage tanks have an outer compartment configured to store liquefied gas and a bladder connected to a wall within the outer compartment configured to store CO2. The CO2 may include liquid CO2. The bladder may include an expandable bladder that expands as the CO2 flows therein.

The method further includes connecting each of the one or more articulated rigid loading arms, via a first controller, to the outer compartment or the bladder of each of the one or more dual-fluid storage tanks. The first controller may be located on the liquefied gas carrier.

If the outer compartment contains liquefied gas, in response to reception of a first liquefied gas pump operation signal from the first controller and a second liquefied gas pump operation signal from a second controller, the method may further include pumping a first liquefied gas from the outer compartment to one or more liquefied gas storage tanks and of (a) a second liquefied gas from one or more liquefied gas storage tanks to the outer compartment or (b) CO2 from one or more CO2 storage tanks to the bladder. The second controller may be located at the location.

Alternatively, if the bladder contains CO2, in response to reception of a first CO2 signal from the first controller and a signal from a second CO2 signal from the second controller, the method may further include pumping CO2 from the bladder to one or more CO2 storage tanks at the location and the second liquefied gas from one or more liquefied gas storage tanks to the outer compartment.

In some embodiments, the method further includes directing the CO2 from the one or more CO2 storage tanks via the first controller and the second controller to a dehydration unit positioned at the location. The method may also include dehydrating the CO2 by operation of the dehydration unit via the second controller before loading the CO2 on the liquefied gas carrier.

FIG. 6 is a simplified block diagram for unloading/loading liquefied gas and carbon dioxide in a liquefied gas carrier. In certain embodiments, the method includes the step 602 of stationing a liquefied gas carrier at a location. As described herein, the liquefied gas carrier contains one or more dual-fluid storage tanks positioned on the liquefied gas carrier to transport liquid gas that includes liquefied gas and/or CO2. The one or more dual-fluid storage tanks contain (a) an outer shell, (b) an outer compartment positioned within the outer shell configured to store the liquefied gas, (c) a bladder positioned within the outer compartment connected to a wall within the outer compartment and is configured to store the CO2, and (d) insulation positioned between the outer shell and the outer compartment to provide temperature regulation for the liquefied gas when positioned in the outer compartment and CO2 in the bladder.

The method also includes the step 604 of aligning one or more articulated rigid loading arms positioned at the location with the one or more dual-fluid storage tanks. The method further includes the step 606 of connecting each of the one or more articulated rigid loading arms to the outer compartment or the bladder of each of the one or more dual-fluid storage tanks, as understood by those skilled in the art. The method also includes the step 608 of pumping the liquid gas from the outer compartment or the CO2 from the bladder to one or more discharge storage tanks at the location, as understood by those skilled in the art. The method further includes the step 610 of pumping the liquid gas and/or CO2 from one or more storage tanks to the outer compartment or the bladder. The method also includes the step 612 of disconnecting each of the one or more articulated rigid loading arms from the outer compartment or the bladder of each of the one or more dual-fluid storage tanks.

The method may further include the step of directing the fluid, CO2, from the one or more CO2 storage tanks to a dehydration unit positioned at the location. The method also includes the step of dehydrating the CO2 by operation of the dehydration unit before loading the CO2 on the liquefied gas carrier.

Figure 7A:
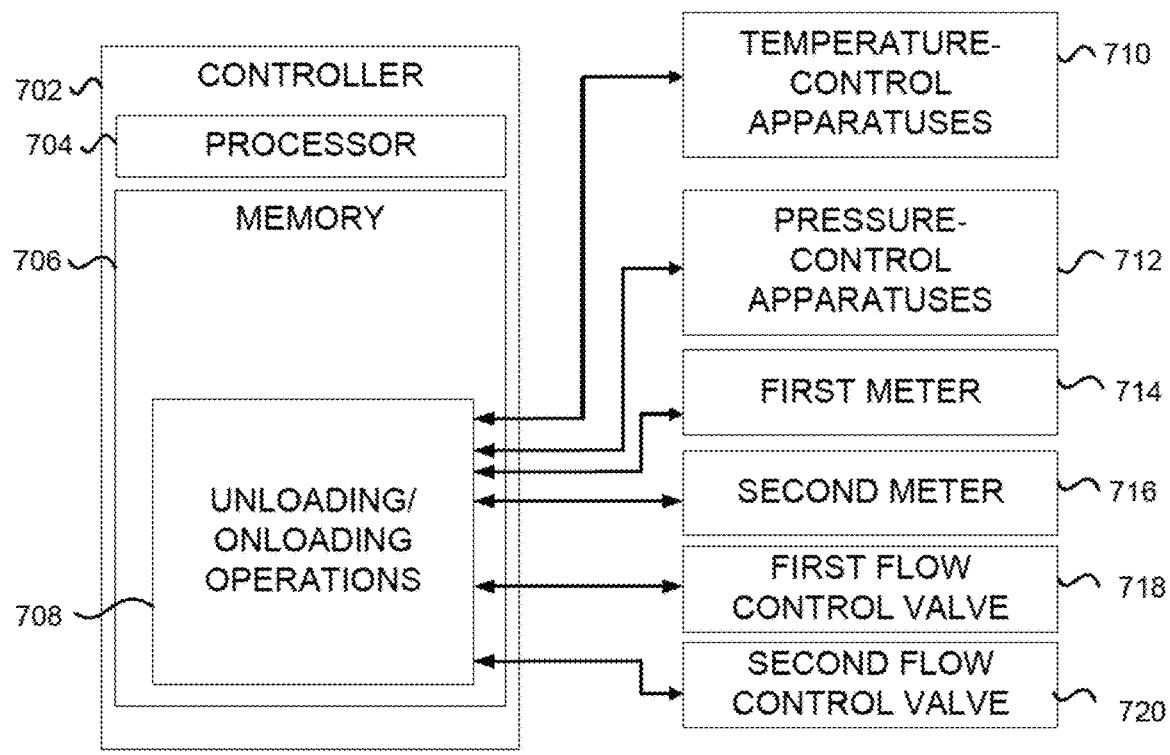
FIG. 7A-7C are flow diagrams that illustrate a controller for unloading/loading liquefied gas and carbon dioxide in a liquefied gas carrier, according to an embodiment of the disclosure.

FIG. 7A is a simplified diagram implemented in a liquefied gas carrier controller, for controlling unloading and onloading operations from the liquefied gas carrier. The liquefied gas carrier may be an LNG carrier, an LPG carrier, or another type of liquefied gas carrier. Embodiments include a controller for a liquefied gas carrier for transporting liquefied gas and CO2. The controller may include a processor 704, a memory 706, and unloading or onloading operations instructions 708. The liquefied gas carrier controller 702 may include memory 706 and one or more processors 704. The memory 706 may store instructions executable by one or more processors 704. In an example, the memory 706 may be a non-transitory machine-readable storage medium. As used herein, a "machine-readable storage medium" may be any electronic, magnetic, optical, or other physical storage apparatus or cyber-physical separation storage to contain or store information such as executable instructions, data, and the like. For example, any machine-readable storage medium described herein may be any of random access memory (RAM), volatile memory, non-volatile memory, flash memory, a storage drive (e.g., hard drive), a solid-state drive, any type of storage disc, and the like, or a combination thereof. As noted, the memory 706 may store or include instructions executable by the processor 704. As used herein, a "processor" may include, for example, one processor or multiple processors included in a single device or distributed across multiple computing devices. The processor 704 may be at least one of a central processing unit (CPU), a semiconductor-based microprocessor, a graphics processing unit (GPU), a field-programmable gate array (FPGA) to retrieve and execute instructions, a real-time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements in signal communication.

Figure 7B:
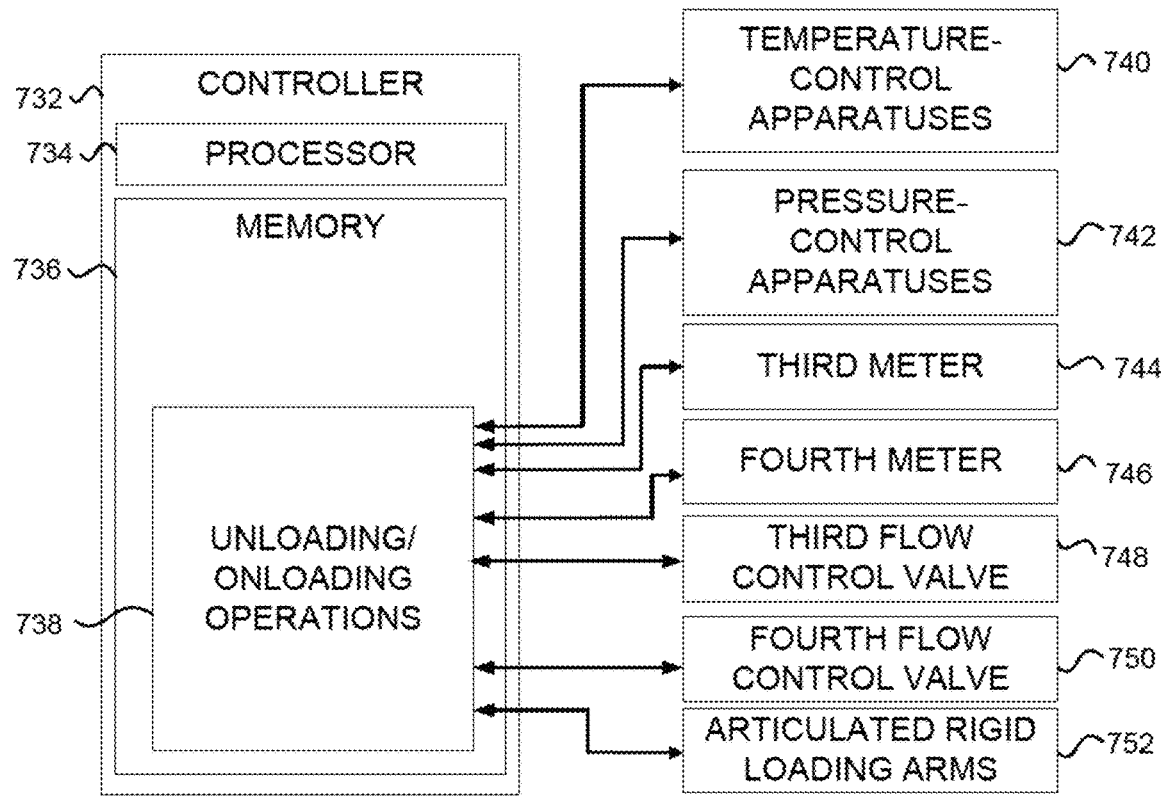

The liquefied gas carrier controller 702 may be in signal communication with various other controllers throughout or external to the liquid gas carrier. The liquefied gas carrier controller 702 may be considered a supervisory controller. In another embodiment, a supervisory controller may include the functionality of controller 732, as shown in FIG. 7B.

As noted, the memory 706 may include instructions for unloading/onloading operations 708. The pressure sensors may send a signal to the liquefied gas carrier controller 702 indicating pressure or another characteristic (for example, temperature, etc.) within a bladder or outer compartment. The liquefied gas carrier controller 702 may perform, execute, or adjust execution of the unloading/onloading operations 708 based on such indications. The unloading/onloading operations 708 may include instructions may use characteristics or signals provided relating to temperature-control apparatuses 710, pressure-control apparatuses 712, first meter 714, second meter 716, first control valve 718, and second control valve 720.

The liquefied gas carrier controller 702 may include a first input/output in signal communication with one or more temperature-control apparatuses 710. The one or more temperature-control apparatuses 710 may be positioned within an outer compartment of each of one or more dual-fluid storage tanks on a liquefied gas carrier. The one or more temperature-control apparatuses 710 may also be positioned within a bladder being positioned within the outer compartment. The liquefied gas carrier controller is configured to obtain a first temperature of a liquefied gas contained within the outer compartment and a second temperature of CO2 contained within the bladder during unloading operations, unloading operations, and transport of the liquefied gas and CO2.

The liquefied gas carrier controller 702 may also include a second input/output in signal communication with one or more pressure-control apparatuses 712. The one or more pressure-control apparatuses 712 may be positioned within the outer compartment of each of one or more dual-fluid storage tanks and the bladder. The liquefied gas carrier controller 702 is configured to obtain a first pressure of the liquefied gas contained within the outer compartment and a second pressure of CO2 contained within the bladder during the unloading operations, the unloading operations, and the transport of the liquefied gas and CO2.

The liquefied gas carrier controller 702 may include instructions to maintain a specified temperature range and/or pressure range within the outer compartment and/or the bladder during transit. Such instructions may use the same or similar components used for unloading/onloading operations. Upon execution of the instructions, during transit, the liquefied gas carrier controller 702 may determine the first temperature of the outer compartment and/or the second temperature of the bladder (for example, via sensors and/or other temperature sensors positioned throughout the one or more dual-fluid storage tanks), the first pressure of the outer compartment and/or the second pressure of the bladder (for example, via pressure sensors), a first fluid level of the outer compartment (for example, via sensors and/or other temperature sensors positioned throughout the one or more dual-fluid storage tanks), and/or a second fluid level of the bladder (for example, via sensors and/or other temperature sensors positioned throughout the one or more dual-fluid storage tanks). The liquefied gas carrier controller 702 may include or store (for example, in memory 706) various pressure ranges for different fluids. After an unloading/onloading operation, the liquefied gas carrier controller 702 may receive an indication on the type of liquefied gas currently contained in the one or more dual-fluid storage tanks. The liquefied gas carrier controller 702 may determine the pressure and/or temperature ranges based on the type of liquefied gas and how much of that type of liquefied gas is in the outer compartments. The liquefied gas carrier controller 702 may monitor the current temperature and/or pressure continuously or substantially continuously. If the current temperature and/or pressure is less than the temperature and/or pressure range, the liquefied gas carrier controller 702 may cause a pump or compressor attached to or proximate to the dual-fluid vessel to activate and operate until pressure is within the range. If the current temperature and/or pressure is greater than the temperature and/or pressure range, the liquefied gas carrier controller 702 may cause a relief valve to actuate to decrease pressure within the dual-fluid vessel. The liquefied gas carrier controller 702 may also control a refrigeration unit to maintain the temperature range.

The liquefied gas carrier controller 702 may further include a third input/output in signal communication with a first flow meter 714 positioned at a first inlet of the outer compartment and a second flow 716 meter positioned at a second inlet of the bladder. The liquefied gas carrier controller 702 is configured to measure a first flow rate of the liquefied gas and a second flow rate of the CO2.

The liquefied gas carrier controller 702 may also include a fourth input/output in signal communication with a first control valve 718. The first control valve 718 designed to adjust flow of the liquefied gas via one or more unloading/loading pumps positioned on the liquefied gas carrier thereby modifying the first flow rate of the liquefied gas and a second control valve 720. The second control valve 720 designed to adjust flow of the CO2 via the one or more unloading/loading pumps thereby modifying the second flow rate.

The liquefied gas carrier controller 702 is configured to, after initiation of the unloading operations or the loading operations, determine whether the first flow rate or the second flow rate is to be modified based on an outer compartment temperature, an outer compartment pressure, a bladder pressure, or a bladder temperature. In response to a determination that the first flow rate is to be modified, the liquefied gas carrier controller 702 may adjust a position of the first flow control valve that adjusts flow of the liquefied gas, thereby modifying the first flow rate. The liquefied gas carrier controller 702 may also in response to a determination that the second flow rate is to be modified, adjust a position of the second flow control valve that adjusts flow of the CO2, thereby modifying the second flow rate.

FIG. 7B is a simplified diagram implemented in a location controller, for controlling unloading and onloading operations at the location. The location controller 732 may include a processor 734, a memory 736, and unloading or onloading operations instructions 708. The location controller 732 may include memory 736 and one or more processors 704. The memory 706 may store instructions executable by one or more processors 734. In an example, the memory 736 may be a non-transitory machine-readable storage medium. As noted, the memory 736 may store or include instructions executable by the processor 734. The processor 734 may be at least one of a CPU, a semiconductor-based microprocessor, a GPU, a FPGA to retrieve and execute instructions, a RTP, other electronic circuitry suitable for the retrieval and execution instructions stored on a machine-readable storage medium, or a combination thereof.

The location controller 732 may be in signal communication with various other controllers throughout the location and internal to the liquid gas carrier. The location controller 732 may be considered a supervisory controller. In another embodiment, a supervisory controller may include the functionality of the liquefied gas carrier controller 702 and/or the location controller 732.

As noted, the memory 736 may include instructions for unloading/onloading operations 738. The pressure sensors may send a signal to the location controller 732 indicating pressure or another characteristic (for example, temperature or flow rate) within a bladder or outer compartment. The location controller 732 may perform, execute, or adjust execution of the unloading/onloading operations 708 based on such indications. The unloading/onloading operations 708 may include instructions may use characteristics or signals provided relating to temperature-control apparatuses 740, pressure-control apparatuses 742, third meter 744, fourth meter 746, third control valve 748, fourth control valve 750, and rigid loading arms 752.

The location controller 732 may include a first input/output in signal communication with one or more temperature-control apparatuses 740. The one or more temperature-control apparatuses 740 may be positioned within the liquefied gas storage tanks at the location. The one or more temperature-control apparatuses 740 may also be positioned within the CO2 storage tanks at the location. The location controller 732 is configured to obtain a first temperature of a liquefied gas contained within the liquefied gas storage tanks and a second temperature of CO2 contained within the CO2 storage tanks at the location during unloading operations and unloading operations of the liquefied gas and CO2.

The location controller 732 may also include a second input/output in signal communication with one or more pressure-control apparatuses 742. The one or more pressure-control apparatuses 742 may be positioned within the liquefied gas storage tanks and the CO2 storage tanks at the location. The location controller 732 is configured to obtain a third pressure of the liquefied gas at the location and a fourth pressure of CO2 at the location during the unloading operations and the loading operations of the liquefied gas and CO2.

The location controller 732 may include instructions to maintain a specified temperature range and/or pressure range within the liquefied gas storage tanks and the CO2 storage tanks. Such instructions may use the same or similar components used for unloading/onloading operations. Upon execution of the instructions, the location controller 732 may determine the third temperature of the liquefied gas storage tanks and/or the fourth temperature of the CO2 storage tanks (for example, via sensors and/or other temperature sensors positioned throughout the liquefied gas storage tanks and the CO2 storage tanks), the third pressure of the liquefied gas storage tanks and/or the fourth pressure of the CO2 storage tanks (for example, via pressure sensors), a third fluid level of the liquefied gas storage tanks (e.g., via sensors for example and/or other temperature sensors positioned throughout the liquefied gas storage tanks), and/or a fourth fluid level of the CO2 storage tanks (for example, via sensors and/or other temperature sensors positioned throughout the CO2 storage tanks). The location controller 732 may include or store (for example, in memory 736) various pressure ranges for different fluids. After an unloading/onloading operation, the location controller 732 may receive an indication on the type of liquefied gas currently contained in the liquefied gas storage tanks or CO2 storage tanks. The location controller 732 may determine the pressure and/or temperature ranges based on the type of liquefied gas and how much of that type of liquefied gas is in the liquefied gas storage tanks or CO2 storage tanks. The location controller 732 may monitor the current temperature and/or pressure continuously or substantially continuously. If the current temperature and/or pressure is less than the temperature and/or pressure range, the location controller 732 may cause a pump or compressor attached to or proximate to the liquefied gas storage tanks or CO2 storage tanks to activate and operate until pressure is within the range. If the current temperature and/or pressure is greater than the temperature and/or pressure range, the location controller 732 may cause a relief valve to actuate to decrease pressure within the liquefied gas storage tanks or CO2 storage tanks. The location controller 732 may also control a refrigeration unit to maintain the temperature range.

The location controller 732 may further include a third input/output in signal communication with a third flow meter 744 positioned at an inlet of the liquefied gas storage tanks and a fourth flow 746 meter positioned at an inlet of the CO2 storage tanks. The location controller 732 is configured to measure a third flow rate of the liquefied gas and a fourth flow rate of the CO2.

The location controller 732 may also include a fourth input/output in signal communication with a third control valve 748. The third control valve 748 is designed to adjust flow of the liquefied gas via one or more liquefied gas unloading/loading pumps positioned at the location thereby modifying the third flow rate of the liquefied gas. The fourth control valve 750 designed to adjust flow of the CO2 via the one or more CO2 unloading/loading pumps thereby modifying the fourth flow rate.

The location controller 732 may also include a fifth input/output in signal communication with the one or more articulated rigid loading arms 752. The one or more articulated rigid loading arms 752 connects the dual-fluid storage tank on the liquefied gas carrier to the location. At the location, the one or more articulated loading arms 752 connect to a conduit that may supply the liquefied gas to the liquefied gas storage tanks or the CO2 storage tanks. The conduit may be a hose, a pipe, or another form of transporting liquid gases.

The location controller 732 is configured to, after initiation of the unloading operations or the loading operations, determine whether the third flow rate or the fourth flow rate is to be modified based on an liquefied gas storage tank temperature, a liquefied gas storage tank pressure, a $CO_2$ storage tank pressure, or a $CO_2$ storage tank temperature. In response to a determination that the third flow rate is to be modified, the location controller 732 may adjust a position of the third flow control valve that adjusts flow of the liquefied gas, thereby modifying the third flow rate. The location controller 732 may also in response to a determination that the second flow rate is to be modified, adjust a position of the second flow control valve that adjusts flow of the $CO_2$, thereby modifying the second flow rate.

Unloading operations may include controlling the flow from the outer compartment and bladder and shutting off pumps when pressure is outside of safe operating conditions. Onloading operations may include controlling flow from the $CO_2$ storage tanks and liquefied gas storage tanks at a location and shutting off pumps when pressure is outside of safe operating conditions. In certain embodiments, the location controller 732 may control the operation of a liquefied gas pump used to load/unload liquefied gas and a $CO_2$ pump used to load/unload $CO_2$. In certain embodiments, the liquefied gas carrier controller 702 may control nitrogen operations from nearby nitrogen storage vessels or on-board nitrogen tanks. The liquefied gas carrier controller 702 may determine, based on signals from the pressure sensors, when nitrogen may be added to the outer compartment.

Figure 7C:
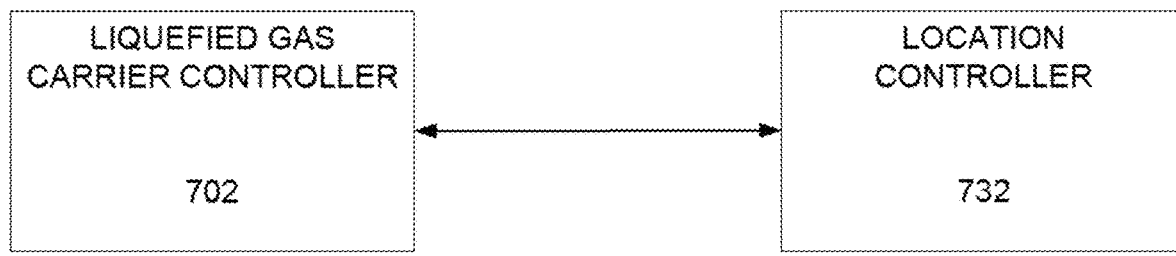

FIG. 7C is a simplified diagram of the interaction between the liquefied gas carrier controller 702 and the location controller 732. The liquefied gas carrier controller 702 and the location controller 732 may communicate to assist in loading operations and unloading operations. The location controller 732 may be the supervisory controller. The supervisory controller may receive signals from the liquefied gas carrier controller 702 to coordinate the loading operations and unloading operations.

Figure 8:
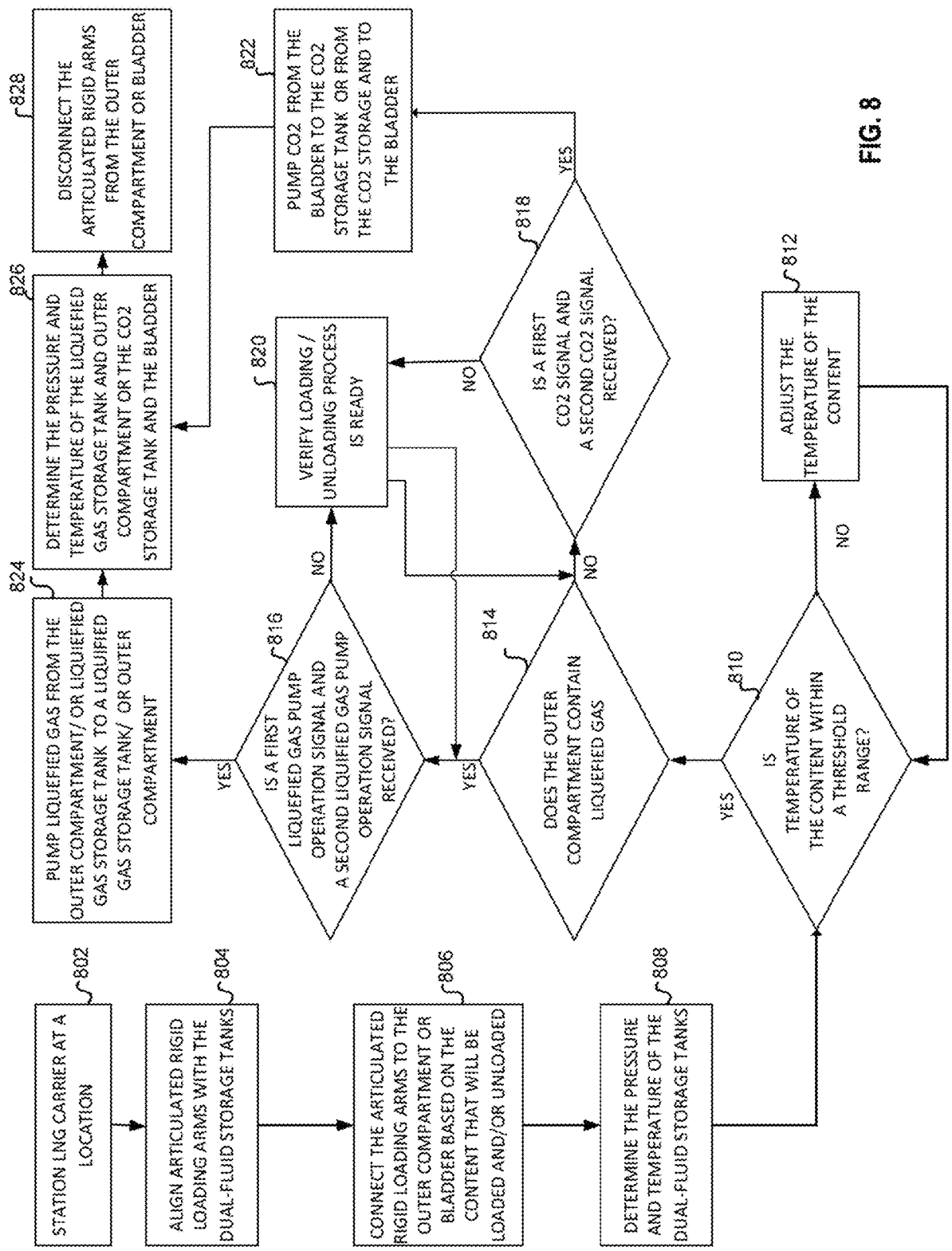
FIG. 8 is a simplified diagram implemented in a controller, for controlling unloading and onloading operations, according to an embodiment of the disclosure.

FIG. 8 is a simplified diagram implemented in a controller, for controlling unloading and onloading operations. In certain embodiments, the method includes the step 802 of stationing an LNG carrier at a location. The method further includes the step 804 of aligning the articulated rigid arms with the dual-fluid storage tanks. The method also includes the step 806 of connecting the articulated rigid loading arms to the outer compartment or bladder, based on the content that will be loaded and/or unloaded. The method further includes the step 808 of determining the pressure and temperature of the dual-fluid storage tanks (for example, via one or more sensors positioned therein and in signal communication with the controller).

The controller will then determine whether the temperature of the content is within a threshold range at step 810. The threshold range may be determined by or preselected based on the type of liquefied gas within the dual-fluid storage tank. If it is determined that the temperature of the content is not within the threshold range, the method further includes the step 812 of adjusting the temperature of the content. The temperature of content may be adjusted using refrigeration units or other apparatuses known by those skilled in the art. The temperature may be adjusted until the temperature of the content is within the threshold range for the content.

If the temperature of the content is within the threshold range, the controller then determines at step 814 whether the outer compartment contains liquefied gas. If the outer compartment does contain liquefied gas, it is then determined, at step 816, whether a first liquefied gas pump operation signal and a second liquefied gas pump operation signal received. The first liquefied gas pump operation signal may be received from the first liquefied gas pump located on the LNG carrier. The second liquefied gas pump operation signal may be received from the second liquefied gas pump located at the location.

If the first liquefied gas pump operation signal and the second liquefied gas pump operation signal is not received, the method further includes the step 820 of verifying whether the loading or unloading process is ready. Verifying that the loading or unloading process is ready may include verifying that both the first liquefied gas pump and the second liquefied gas pump is on and operational, verifying that the conduits that may be used to transport the liquefied gases are connected, and other operational checks known to those skilled in the art. Once the verification process is complete, the controller then repeats step 816.

If it determined that the first liquefied gas pump operation signal and the second liquefied gas pump operation signal is received, the method further includes the step 824 of pumping liquefied gas from the outer compartment to a liquefied gas storage tank or from the liquefied gas storage tank to the outer compartment depending on whether the liquefied gas is being loaded or unloaded. The method also includes the step 826 of determining the pressure and temperature of the liquefied gas storage tank and the outer compartment or the $CO_2$ storage tank and the bladder depending on which liquefied gas is being loaded or unloaded. The method further includes the step 828 of disconnecting the articulated rigid arms from the outer compartment or the bladder.

If the outer compartment does not contain liquefied gas, the controller then determines at step 818 whether a first $CO_2$ signal and a second $CO_2$ signal was received. The first $CO_2$ signal may be received from the first $CO_2$ pump located on the LNG carrier. The second $CO_2$ signal may be received from the second $CO_2$ pump located at the location. If it is determined that the first $CO_2$ signal and the second $CO_2$ signal is not received, the method further includes the step 820 of verifying whether the loading or unloading process is ready. Verifying that the loading or unloading process is ready may include verifying that both the first $CO_2$ pump and the second $CO_2$ pump is on and operational, verifying that the conduits that may be used to transport the $CO_2$ are connected, and other operational checks known to those skilled in the art. Once the verification process is complete, the controller then repeats step 818.

If it is determined that the first $CO_2$ signal and the second $CO_2$ signal is received, the method further includes the step 822 of pumping $CO_2$ from the bladder to the $CO_2$ storage tank or from the $CO_2$ storage tank to the bladder. The method also includes the step 826 of determining the pressure and temperature of the liquefied gas storage tank and the outer compartment or the $CO_2$ storage tank and the bladder depending on which liquefied gas is being loaded or unloaded. The method further includes the step 828 of disconnecting the articulated rigid arms from the outer compartment or the bladder.

This application is a continuation of U.S. Non-Provisional application Ser. No. 18/234,800, filed Aug. 16, 2023, titled "SYSTEMS AND METHODS FOR BACKHAUL TRANSPORTATION OF LIQUEFIED GAS AND CO2 USING LIQUEFIED GAS CARRIERS," which is a continuation-in-part of U.S. Non-Provisional application Ser. No. 18/207,722, filed Jun. 9, 2023, titled "SCALABLE GREENHOUSE GAS CAPTURE SYSTEMS AND METHODS," now U.S. Pat. No. 11,920,504, issued Mar. 5, 2024, which is a continuation of U.S. Non-Provisional application Ser. No. 18/093,756, filed Jan. 5, 2023, titled "SCALABLE GREENHOUSE GAS CAPTURE SYSTEMS AND METHODS," now U.S. Pat. No. 11,761,366, issued Sep. 19, 2023, which is a divisional of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. Non-Provisional application Ser. No. 18/207,722 is also a continuation of U.S. Non-Provisional application Ser. No. 18/093,747, filed Jan. 5, 2023, titled "SCALABLE GREENHOUSE GAS CAPTURE SYSTEMS AND METHODS," now U.S. Pat. No. 11,739,679, issued Aug. 29, 2023, which is a divisional of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. application Ser. No. 18/234,800 is also a continuation-in-part of U.S. Non-Provisional application Ser. No. 18/227,472, filed Jul. 28, 2023, titled "SYSTEMS AND METHODS FOR TRANSPORTING FUEL AND CARBON DIOXIDE IN A DUAL FLUID VESSEL," which is a continuation U.S. Non-Provisional application Ser. No. 18/129,926, filed Apr. 3, 2023, titled "SYSTEMS AND METHODS FOR TRANSPORTING FUEL AND CARBON DIOXIDE IN A DUAL FLUID VESSEL," now U.S. Pat. No. 11,774,042, issued Oct. 3, 2023, which is a divisional of U.S. Non-Provisional application Ser. No. 18/082,656, filed Dec. 16, 2022, titled "SYSTEMS AND METHODS FOR TRANSPORTING FUEL AND CARBON DIOXIDE IN A DUAL FLUID VESSEL," now U.S. Pat. No. 11,655,940, issued May 23, 2023, which claims priority to, and the benefit of, U.S. Provisional Application No. 63/265,554, filed Dec. 16, 2021, titled "SYSTEMS AND METHODS FOR TRANSPORTING FUEL AND CO2 IN A DUAL FLUID VESSEL," and U.S. Provisional Application No. 63/377,822, filed Sep. 30, 2022, titled "SYSTEMS AND METHODS FOR TRANSPORTING FUEL AND CO2 IN A DUAL FLUID VESSEL," the disclosures of which are incorporated herein by reference in their entireties. U.S. Non-Provisional application Ser. No. 18/082,656 is a continuation-in-part of U.S. Non-Provisional application Ser. No. 17/739,488, filed May 9, 2022, titled "SCALABLE GREENHOUSE GAS CAPTURE SYSTEMS AND METHODS," now U.S. Pat. No. 11,578,836, issued Feb. 14, 2023, which is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to related to U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. Non-Provisional application Ser. No. 18/082,656 is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties. U.S. application Ser. No. 18/234,800 is further a continuation-in-part of U.S. Non-Provisional application Ser. No. 18/217,270, filed Jun. 30, 2023, titled "SCALABLE GREENHOUSE GAS CAPTURE SYSTEMS AND METHODS," which is a continuation of U.S. Non-Provisional application Ser. No. 18/093,741, filed Jan. 5, 2023, titled "SCALABLE GREENHOUSE GAS CAPTURE SYSTEMS AND METHODS," now U.S. Pat. No. 11,815,227, issued Nov. 14, 2023, which is a divisional of U.S. Non-Provisional application Ser. No. 17/739,488, filed May 9, 2022, titled "SCALABLE GREENHOUSE GAS CAPTURE SYSTEMS AND METHODS," now U.S. Pat. No. 11,578,836, issued Feb. 14, 2023, which is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to related to U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties.

In the drawings and specification, several embodiments of systems and methods to provide scalable greenhouse gas capture have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

The invention claimed is:

1. A liquefied gas marine vessel to transport liquefied gas and carbon dioxide (CO2), the liquefied gas marine vessel comprising:
   one or more dual-fluid storage tanks to transport liquefied gas or CO2, the one or more dual-fluid storage tanks having:
      an outer shell;
      compartment positioned within the outer shell to store the liquefied gas;

a bladder positioned within the compartment to expand when the CO2 flows therein, thereby to reduce contamination between the CO2 and the liquefied gas; and insulation positioned between the outer shell and the compartment to provide temperature regulation from external heat sources.

2. The liquefied gas marine vessel of claim 1, wherein a pressure and temperature rating for the one or more dual-fluid storage tanks comprises a maximum pressure of about 80 pounds per square inch gauge (psig) to about 102 pounds psig and a minimum temperature of about −260 degrees Fahrenheit.

3. The liquefied gas marine vessel of claim 1, wherein the one or more dual-fluid storage tanks comprises one or more of spherical tanks, refrigerated tanks, prismatic tanks, cylindrical tanks, or bilobe tanks.

4. The liquefied gas marine vessel of claim 1, wherein the one or more dual-fluid storage tanks includes one or more (a) temperature-control apparatuses to control a temperature within the one or more dual-fluid storage tanks, or (b) pressure-control apparatuses to control a pressure within the one or more dual-fluid storage tanks.

5. The liquefied gas marine vessel of claim 1, further comprising a nitrogen tank positioned proximal and connected to one of the one or more dual-fluid storage tanks and wherein the nitrogen tank is configured to, if the bladder is partially or substantially empty, fill the outer compartment with nitrogen to stabilize the bladder.

6. The liquefied gas marine vessel of claim 1, wherein the one or more dual-fluid storage tanks further includes one or more membranes, waffles, or baffles positioned within the outer compartment of each of the one or more dual-fluid storage tanks.

7. A dual-fluid transport system for transporting liquefied gas and carbon dioxide (CO2), the dual-fluid transport system comprising:
a liquefied gas marine vessel configured to transport liquefied gas and CO2, the liquefied gas marine vessel comprising:
one or more dual-fluid storage tanks positioned on the liquefied gas marine vessel to transport the liquefied gas or the CO2, the one or more dual-fluid storage tanks having:
an outer shell,
an outer compartment positioned within the outer shell, the outer compartment configured to store the liquefied gas,
a bladder positioned within the outer compartment and configured to expand when the CO2 flows therein, thereby to reduce contamination between the CO2 and the liquefied gas, and
insulation positioned between the outer shell and the outer compartment to provide temperature regulation from external heat sources;
one or more pumps configured to pump the liquefied gas and CO2 from the one or more dual-fluid storage tanks;
a first controller positioned within a first control room to control unloading/loading operations of CO2 from the bladder and liquefied gas from the outer compartment;
one or more articulated rigid loading arms positioned at a location and to connect the liquefied gas marine vessel to the location and configured to load and unload the liquefied gas and CO2;

a vapor return line connected to the one or more articulated rigid loading arms and configured to return excess vapor from the liquefied gas to the location;
one or more liquefied gas storage tanks configured to store liquefied gas and one or more CO2 storage tanks configured to store CO2;
a dehydration unit (a) positioned between the one or more articulated rigid loading arms and the one or more liquefied gas storage tanks and (b) configured to remove water from the CO2 when the CO2 is loaded onto the liquefied gas marine vessel; and
a second controller positioned within a location control room at the location and to control unloading/loading operation of CO2 and liquefied gas to/from CO2 storage tanks and liquefied gas storage tanks.

8. The dual-fluid transport system of claim 7, wherein the one or more dual-fluid storage tanks comprises a maximum pressure of about 80 pounds per square inch gauge (psig) to about 102 pounds psig and a minimum temperature of about −260 degrees Fahrenheit.

9. The dual-fluid transport system of claim 7, wherein the one or more dual-fluid storage tanks comprises one or more of spherical tanks, refrigerated tanks, prismatic tanks, cylindrical tanks, or bilobe tanks.

10. The dual-fluid transport system of claim 7, wherein the one or more dual-fluid storage tanks includes one or more of (a) temperature-control apparatuses to control a temperature within the one or more dual-fluid storage tanks or (b) pressure-control apparatuses to control a pressure within the one or more dual-fluid storage tanks.

11. The dual-fluid transport system of claim 7, further comprising a nitrogen tank positioned proximal and connected to one of the one or more dual-fluid storage tanks and wherein the nitrogen tank is configured to, if the bladder is partially or substantially empty, fill the outer compartment with nitrogen to stabilize the bladder.

12. The dual-fluid transport system of claim 7, wherein the one or more dual-fluid storage tanks includes one or more membranes, waffles, or baffles positioned within each of the one or more dual-fluid storage tanks.

13. The dual-fluid transport system of claim 7, wherein the one or more dual-fluid storage tanks further comprises one or more sensors, the one or more sensors to determine a temperature or a pressure of the liquefied gas and the CO2.

14. The dual-fluid transport system of claim 7, further comprising a liquefaction unit positioned at the location to transfer the CO2 to the liquefied gas marine vessel.

15. The dual-fluid transport system of claim 7, further comprising one or more valves positioned between the one or more articulated rigid loading arms and the one or more liquefied gas storage tanks and one or more CO2 storage tanks, and wherein the one or more valves are controlled by the first controller and/or the second controller thereby to control the flow of the liquefied gas and the CO2.

16. A method of unloading/loading liquefied gas and carbon dioxide (CO2) at a location, the method comprising:
aligning one or more articulated rigid loading arms positioned at a location with one or more dual-fluid storage tanks positioned on a liquefied gas marine vessel, the one or more dual-fluid storage tanks including an outer compartment configured to store liquefied gas and a bladder connected to a wall within the outer compartment configured to store CO2;
connecting each of the one or more articulated rigid loading arms to the outer compartment or the bladder of each of the one or more dual-fluid storage tanks; and if the outer compartment contains liquefied gas:
  in response to reception of a first liquefied gas pump operation signal from a first controller and a second liquefied gas pump operation signal from a second controller, pumping a first liquefied gas from the outer compartment to one or more liquefied gas storage tanks and one of (a) a second liquefied gas from one or more liquefied gas storage tanks to the outer compartment or (b) $CO_2$ from one or more $CO_2$ storage tanks to the bladder, or
if the bladder contains $CO_2$:
  in response to reception of a first $CO_2$ signal from the first controller and a signal from a second $CO_2$ signal from the second controller, pumping $CO_2$ from the bladder to one or more $CO_2$ storage tanks at the location and the second liquefied gas from one or more liquefied gas storage tanks to the outer compartment.

17. The method of claim 16, wherein the $CO_2$ comprises liquid $CO_2$.

18. The method of claim 16, wherein the bladder comprises an expandable bladder that expands as the $CO_2$ flows therein.

19. The method of claim 16, further comprising:
  directing the $CO_2$ from the one or more $CO_2$ storage tanks via the first controller and the second controller to a dehydration unit positioned at the location; and
  dehydrating the $CO_2$ by operation of the dehydration unit via the second controller before loading the $CO_2$ on the liquefied gas marine vessel.

20. The method of claim 16, wherein the first controller is located on the liquefied gas marine vessel, and wherein the second controller is located at the location.

21. A controller for a liquefied gas marine vessel for transporting liquefied gas and carbon dioxide ($CO_2$), the controller comprising:
  a first input/output in signal communication with one or more temperature-control apparatuses positioned within an outer compartment of each of one or more dual-fluid storage tanks on a liquefied gas marine vessel and a bladder positioned within the outer compartment, the controller configured to obtain a first temperature of a liquefied gas contained within the outer compartment and a second temperature of $CO_2$ contained within the bladder during unloading operations, onloading operations, and transport of the liquefied gas and $CO_2$;
  a second input/output in signal communication with one or more pressure-control apparatuses positioned within the outer compartment of each of one or more dual-fluid storage tanks and the bladder, the controller configured to obtain a first pressure of the liquefied gas contained within the outer compartment and a second pressure of $CO_2$ contained within the bladder during one or more of the unloading operations, the onloading operations, or the transport of the liquefied gas and $CO_2$;
  a third input/output in signal communication with a first flow meter positioned at a first inlet of the outer compartment and a second flow meter positioned at a second inlet of the bladder, the controller configured to measure a first flow rate of the liquefied gas and a second flow rate of the $CO_2$; and
  a fourth input/output in signal communication with a first control valve, the first control valve designed to adjust flow of the liquefied gas via one or more unloading/loading pumps positioned on the liquefied gas marine vessel, thereby to modify the first flow rate of the liquefied gas, and a second flow control valve, the second control valve designed to adjust flow of the $CO_2$ via the one or more unloading/loading pumps, thereby to modify the second flow rate, the controller configured to:
  after initiation of the unloading operations or the onloading operations:
    determine whether the first flow rate or the second flow rate is to be modified based on an outer compartment temperature, an outer compartment pressure, a bladder pressure, or a bladder temperature,
  in response to a determination that the first flow rate is to be modified:
    adjust a position of the first flow control valve that adjusts flow of the liquefied gas, thereby modifying the first flow rate, and
  in response to a determination that the second flow rate is to be modified:
    adjust a position of the second flow control valve that adjusts flow of the $CO_2$, thereby modifying the second flow rate.

22. The controller of claim 21, wherein modification of the first flow rate or the second flow rate is based on a first amount of the liquefied gas within the outer compartment and a second amount of the $CO_2$ within the bladder.

23. The controller of claim 21, wherein modification of the first flow rate or the second flow rate is based on a third amount of the liquefied gas within one or more liquefied gas storage tanks positioned at a location and a second amount of the $CO_2$ within one or more $CO_2$ storage tanks.

* * * * *